(12) United States Patent
Honda et al.

(10) Patent No.: US 9,437,227 B1
(45) Date of Patent: Sep. 6, 2016

(54) THERMALLY ASSISTED MAGNETIC RECORDING HEAD SLIDER, METHOD OF MANUFACTURING THE SAME, HEAD GIMBAL ASSEMBLY, AND HARD DISK DRIVE

(71) Applicant: SAE Magnetics (H.K.) Ltd., Hong Kong (CN)

(72) Inventors: Takashi Honda, Hong Kong (CN); Seiichi Takayama, Hong Kong (CN); Ryuji Fujii, Hong Kong (CN)

(73) Assignee: SAE Magnetic (H.K.) Ltd., Hong Kong (CN)

( * ) Notice: Subject to any disclaimer, the term of this patent is extended or adjusted under 35 U.S.C. 154(b) by 0 days.

(21) Appl. No.: 14/870,672

(22) Filed: Sep. 30, 2015

(51) Int. Cl.
| | |
|---|---|
| *G11B 5/127* | (2006.01) |
| *G11B 11/00* | (2006.01) |
| *G11B 5/02* | (2006.01) |
| *G11B 5/48* | (2006.01) |
| *G11B 5/00* | (2006.01) |

(52) U.S. Cl.
CPC ........... *G11B 5/4826* (2013.01); *G11B 5/1272* (2013.01); *G11B 5/4866* (2013.01); *G11B 2005/0021* (2013.01)

(58) Field of Classification Search
CPC ................. G11B 11/10534; G11B 11/1058; G11B 2005/0021; G11B 2005/0005; G11B 5/314; G11B 5/3903; B82Y 10/00; B82Y 11/10543; B82Y 5/3163
USPC ....... 369/13.33, 13.13, 13.17, 13.32; 360/59, 360/313, 244.1, 234.7; 29/603.01; 250/203.2
See application file for complete search history.

(56) References Cited

U.S. PATENT DOCUMENTS

| | | | |
|---|---|---|---|
| 6,388,840 B1 * | 5/2002 | Ohwe | G11B 5/486 360/244.1 |
| 8,310,903 B1 | 11/2012 | Takayama et al. | |
| 2011/0228650 A1 | 9/2011 | Shimazawa et al. | |
| 2013/0322221 A1 | 12/2013 | Naniwa et al. | |
| 2014/0209664 A1 | 7/2014 | Takayama et al. | |
| 2015/0131415 A1 | 5/2015 | Peng | |

* cited by examiner

*Primary Examiner* — Nabil Hindi
(74) *Attorney, Agent, or Firm* — Nixon & Vanderhye PC

(57) ABSTRACT

A thermally assisted magnetic recording head slider includes a light source unit having a light emitting element emitting laser light and a submount holding the light emitting element, and slider including a thin-film laminated part having a main magnetic pole layer, a near-field light generating element and an optical waveguide. A combination of the light emitting element and near-field light generating element is composed of a first pattern or second pattern. The light source unit is mounted on a light source placing surface so that a substrate surface of the light emitting element is orthogonal to a laminated surface of the thin-film laminated part. A plurality of electrode pads are formed on the outer end surface of the slider. The light source unit has a first element electrode and second element electrode. A first connecting wiring part and second connecting wiring part, which connected the first element electrode and second element electrode with a first electrode pad and second electrode pad, are formed on a light source placing surface.

13 Claims, 26 Drawing Sheets

THERMALLY ASSISTED MAGNETIC RECORDING HEAD SLIDER, METHOD OF MANUFACTURING THE SAME, HEAD GIMBAL ASSEMBLY, AND HARD DISK DRIVE

BACKGROUND

1. Field of the Invention

The present invention relates to a thermally assisted magnetic recording head slider having a thermally assisted magnetic recording head recording data on a magnetic recording medium by thermally assisted magnetic recording method using near-field light and a method of manufacturing the same, and a head gimbal assembly and a hard disk drive each having the thermally assisted magnetic recording head slider.

2. Related Background Art

In recent years, as hard disk drives have been increasing their recording densities, thin-film magnetic heads recording data on magnetic recording media have been required to further improve their performances. As the thin-film magnetic heads, those of composite type having a structure in which a reproducing head having a magnetoresistive device (hereinafter, referred to also as an "MR device") for read and a recording head having an electromagnetic coil element for write are laminated have been conventionally in wide use. In a magnetic disk drive, the thin-film magnetic head is provided on a slider which very slightly floats from the magnetic recording medium.

Incidentally, the magnetic disk drive records data by magnetizing magnetic fine particles on the magnetic recording medium using the recording head. In order to increase the recording density of the magnetic recording medium, it is effective to make the magnetic fine particles smaller.

When the magnetic fine particles are made smaller, however, there arises a problem that the magnetization thereof becomes unstable with respect to heat as the particles reduce in volume, thereby increasing the possibility that the data recorded on the magnetic recording medium is lost. To solve the problem, it is effective to increase the magnetic energy of the magnetic fine particles to thereby enhance the stability of magnetization. When the magnetic energy of the magnetic fine particles is increased, however, there arises another problem that the coercive force (difficulty in reversing magnetization) of the magnetic recording medium increases to deteriorate the data recording performance.

To solve such problems, a method called thermally assisted magnetic recording has been conventionally proposed. When recording data on a magnetic recording medium having a large coercive force, the thin-film magnetic head employing the thermally assisted magnetic recording (hereinafter, referred to as a "thermally assisted magnetic recording head") records data while instantaneously heating and thereby increasing the temperature of a portion of the magnetic recording medium where data will be recorded.

Since the magnetic fine particles decrease in coercive force when the temperature is increased, instantaneous heating makes it possible to record data even on the magnetic recording medium having a high coercive force at room temperature. The portion of the magnetic recording medium where the data has been recorded is decreased in temperature after the recording of data and thereby increases in coercive force. Therefore, by using the thermally assisted magnetic recording head, it becomes possible to make the magnetic fine particles finer as well as stabilize recording in the magnetic disk drive.

On the other hand, near-field light is used as means for heating the magnetic recording medium in the conventional thermally assisted magnetic recording head. When light enters an opening smaller than the wavelength of light, the light slightly seeps from the opening and locally exists near the opening. The light locally existing near the opening is called near-field light. The near-field light is confined in a region much smaller than that of a spot light obtained by collecting light using a lens, so that use of the near-field light makes it possible to heat only a limited extremely small recording region of the magnetic recording medium.

Known as a method of generating the near-field light in the conventional thermally assisted magnetic recording head is a method using a plasmon generator (also called "PG") that is a minute metal piece. In this method, the near-field light is generated by guiding laser light to the PG via an optical waveguide.

In this case, it is preferable that a semiconductor laser such as laser diode (also called "LD") or the like, which is a light source of laser light, is arranged in the neighborhood of the PG. Then, structures, which are disclosed for example, in U.S. Patent Application Publication No. 2011/0228650A1 (referred also to as patent document 1), U.S. Patent Application Publication No. 2014/0209664A1 (referred also to as patent document 2), U.S. Patent Application Publication No. 2015/0131415A1 (referred also to as patent document 3), U.S. Pat. No. 8,310,903 (referred also to as patent document 4), are conventionally known. The semiconductor laser is fixed on the slider, and laser light of the semiconductor laser are guided to the optical waveguide of the slider, in these structures.

SUMMARY OF THE INVENTION

By the way, edge-emitting LDs and surface-emitting LDs are included in the LD, which is a light source of laser light. And LD of TE (Transverse Electric) mode (TE mode LD) and LD of TM (Transverse Magnetic) mode (TM mode LD) are included in the edge-emitting LDs. The TE mode is a mode which laser light, having the polarization parallel to a semiconductor substrate, is emitted, the TM mode is a mode which laser light, having the polarization vertical to the semiconductor substrate, is emitted. Edge-emitting LDs of TE mode and Edge-emitting LDs of TM mode are used as the light source of laser light, in the thermally assisted magnetic recording head.

Further, in the thermally assisted magnetic recording head, PGs are formed so that their conversion efficiency become maximum when the polarization of laser light emitted from LD is orthogonal to a laminated surface of the thermally assisted magnetic recording head. Then, PGs are formed corresponding to the LDs used as the light source of laser light. Namely, when the LD is the TE mode LD, the PGs are formed with structure corresponding to laser light of TE mode. Further, when the LD is the TM mode LD, the PGs are formed with structure corresponding to laser light of TM mode.

Conventionally, concerning the thermally assisted magnetic recording head, for example, following structure are disclosed in U.S. Patent Application Publication No. 2013/0322221A1 (referred also to as patent document 5). The TE mode LD is used, and the PG is formed with TM mode LD in the structure. Further, the direction of the TE mode LD is modified into the 90 degrees turned direction so that the substrate surface of the TE mode LD intersects orthogonally to the laminated surface of the thermally assisted magnetic recording head, the TE mode LD is mounted on the slider. Laser light emitted from the TE mode LD is guided to the PG with the structure.

However, the following problems, concerning the conventional thermally assisted magnetic recording head slider having such structure, have not been solved.

The thermally assisted magnetic recording head slider is mounted on the suspension. Head Gimbals Assembly (hereinafter, referred to also "HGA") is manufactured with the suspension. In this case, hole parts are formed in the flexure and load beam, and the thermally assisted magnetic recording head slider is mounted to the suspension so that the TE mode LD pass through the hole parts.

Accordingly, the slider of the thermally assisted magnetic recording head slider is arranged in one side of the suspension, and the TE mode LD is arranged in the other side of the suspension. Therefore, in manufacturing steps for the HGA, the step for electrical connecting of the recording and reproducing head formed on the slider and wiring of the suspension is performed in one side of the suspension, the step for electrical connecting of the TE mode LD and wiring of the suspension is performed in the other side of the suspension.

However, the direction of the TE mode LD is modified into the 90 degrees turned direction in the thermally assisted magnetic recording head slider. So the direction of wiring, which the TE mode LD is connected, is different from the direction of the wiring, which the recording and reproducing head is connected, and two kinds of direction for wiring are formed. Therefore, electrical connecting step for thermally assisted magnetic recording head slider and the suspension are complicated, and the structure of the manufactured HGA is also complicated.

The above thing is a problem concerning the thermally assisted magnetic recording head slider having the TE mode LD and the PG corresponding to the TM mode LD.

However, the same problem has not been solved concerning the thermally assisted magnetic recording head having the TM mode LD and the PG corresponding to the TE mode LD.

A structure, which electrical connection with the suspension is simplified and the HGA is able to be manufactured simply, is required concerning not only the thermally assisted magnetic recording head slider having the TE mode LD and the PG corresponding to the TM mode LD but also the thermally assisted magnetic recording head slider having the TM mode LD and the PG corresponding to the TE mode LD.

The present invention is made to solve the above problem, and it is an object to provide a thermally assisted magnetic recording head slider having a structure which electrical connection with the suspension is simplified and the HGA is able to be manufactured simply, a method of manufacturing the same and a head gimbal assembly and a hard disk drive having the thermally assisted magnetic recording head slider.

To solve the above problems, the present invention is a thermally assisted magnetic recording head slider including a light source unit having a light emitting element emitting laser light and a submount holding the light emitting element; and a slider including a thin-film laminated part having a main magnetic pole layer, a near-field light generating element and an optical waveguide; a combination of the light emitting element and the near-field light generating element is comprised of a first optical pattern which includes a TE mode LD, which emits Laser light with TE mode, and TM mode PG corresponding to laser light with TM mode or a second optical pattern which includes a TM mode LD, which emits laser light with TM mode, and TE mode PG corresponding to laser light with TE mode, the light source unit is mounted on a light source placing surface, of the slider, arranged rear side of the medium-opposing surface opposing a magnetic recording medium, so that a substrate surface of the light emitting element are orthogonal to a laminated surface of the thin film laminated part, the slider has a plurality of electrode pads formed on an outer end surface of the thin film laminated part side, the light source unit includes a first element electrode and a second element electrode for applying voltage to the light emitting element, and the slider has a first connecting wiring part and a second connecting wiring part, formed on the light source placing surface, which connect the first element electrode and second element electrode with a first electrode pad and a second electrode pad of the plurality of electrode pads and insulated each other.

In the above-described thermally assisted magnetic recording head slider, because the first connecting wiring part and second connecting wiring part connected the first element electrode and second element electrode of the light source unit to the first electrode pad and second electrode pad formed on the outer end surface of the thin film laminated part, electrical connection with suspension are collected to the first, second electrode pads.

Further, it is possible that in the above-described thermally assisted magnetic recording head slider, the first connecting wiring part and the second connecting wiring part respectively have a first wiring electrode and second wiring electrode formed on the light source placing surface; first conductive pad and second conductive pad connected to the first wiring electrode and second wiring electrode and the first element electrode and second element electrode; and a first lead electrode and second lead electrode connected the first wiring electrode and second wiring electrode and the first electrode pad and second electrode pad, the first lead electrode and second lead electrode are insulated each other and formed in the thin-film laminated part.

Further, it is possible that the first lead electrode and second lead electrode have a first inner electrode and a second inner electrode connected the first wiring electrode and second wiring electrode, and formed inside the thin-film laminated part, and a first pad connecting electrode and second pad connecting electrode connected with the first electrode pad and second electrode pad.

Further, it is possible that the first wiring electrode and second wiring electrode have a first band-shaped terminal part and second band-shaped terminal part connected with the first lead electrode and second lead electrode, and a first wide-width terminal part and second wide-width terminal part having width lager than those of the first band-shaped terminal part and second band-shaped terminal part, and connected with the first conductive pad and second conductive pad.

It is preferable that the first band-shaped terminal part and second band-shaped terminal part have main terminal parts which extend along by the outer end surface and sub terminal parts which extend along by direction intersecting orthogonally to main terminal parts.

Further, it is preferable that at least the first wide-width terminal part and second wide-width terminal part are exposed on the light source placing surface in the first wiring electrode and second wiring electrode.

The present invention provides a method of manufacturing a thermally assisted magnetic recording head slider including a light source unit having a light emitting element emitting laser light and a submount holding the light emitting element; and a slider including a thin-film laminated part having a main magnetic pole layer, a near-field light generating element and an optical waveguide, including: a lead electrode forming step being formed first lead electrode and second lead electrode in a thin-film forming process which the-thin film laminated part is formed on a substrate having a plurality of slider regions being formed the sliders along scribe lines, the first lead electrode and second lead electrode are extended from a planned light source placing surface, which becomes a light source placing surface arranged rear side of the medium-opposing surface opposing a magnetic recording medium, after the substrate is cut along the scribe lines, to an outer end surface of the thin-film laminated part; a bar like member forming step being formed a plurality of bar like members having a plurality of the slider regions; a light source unit mounting step being mounted the light source unit on a light source unit area, which the light source unit is mounted, of the light source placing surface, so that substrate surface of the light emitting element are orthogonal to a laminated surface of the thin-film laminated part; and a light source connecting step being connected a first element electrode and a second element electrode, for applying voltage to the light emitting element of the light source unit, with the first lead electrode and second lead electrode respectively.

In case of the above-described method of manufacturing, it is preferable that light source connecting step has a wiring electrode forming step being formed a first wiring electrode and second wiring electrode connected with the light source unit and the first lead electrode and second lead electrode respectively, before the light source unit is mounted on the light source unit area, and a conductive pad forming step being formed a first conductive pad and second conductive pad connected with the first wiring electrode and second wiring electrode and the first element electrode and a second element electrode respectively, after the light source unit is mounted on the light source unit area.

Further, it is preferable that above-described method of manufacturing further including: an electrode pads forming step being formed a plurality of electrode pads, being insulated each other, on the outer end surface of the thin-film laminated part of the slider region; the lead electrode forming step has an inner electrode forming step being formed a first inner electrode and second inner electrode, which connected with the first wiring electrode and second wiring electrode, and formed inside the thin-film laminated part, and an pad connecting electrode forming step being formed a first pad connecting electrode and second pad connecting electrode connected with the first inner electrode and second inner electrode and a first electrode pad and second electrode pad of the plurality of electrode pads.

Further, it is preferable that the wiring electrode forming step is performed such that a first wide-width terminal part and second wide-width terminal part, which connected with the first conductive pad and second conductive pad are formed with width larger than a first band-shaped terminal part and second band-shaped terminal part, which connected with the first lead electrode and second lead electrode.

The present invention provides a head gimbal assembly including a thermally assisted magnetic recording head slider, the thermally assisted magnetic recording head slider including: a light source unit having a light emitting element emitting laser light and a submount holding the light emitting element; and a slider including a thin-film laminated part having a main magnetic pole layer, a near-field light generating element and an optical waveguide; a combination of the light emitting element and the near-field light generating element is comprised of a first optical pattern which includes a TE mode LD, which emits Laser light with TE mode, and TM mode PG corresponding to laser light with TM mode or a second optical pattern which includes a TM mode LD, which emits laser light with TM mode, and TE mode PG corresponding to laser light with TE mode, the light source unit is mounted on a light source placing surface, of the slider, arranged rear side of the medium-opposing surface opposing a magnetic recording medium, so that a substrate surface of the light emitting element are orthogonal to a laminated surface of the thin film laminated part, the slider has a plurality of electrode pads formed on an outer end surface of the thin film laminated part side, the light source unit includes a first element electrode and a second element electrode for applying voltage to the light emitting element, and the slider has a first connecting wiring part and a second connecting wiring part, formed on the light source placing surface, which connect the first element electrode and second element electrode with a first electrode pad and a second electrode pad of the plurality of electrode pads and insulated each other.

In case of the above-described head gimbal assembly, it is preferable that the thermally assisted magnetic recording head slider has a projection projected outside from the outer end surface formed in the light emitting element, the thermally assisted magnetic recording head slider further including: a flexure, being mounted the thermally assisted magnetic recording head slider, a passing hole, which the light source unit pass through, are formed, a plurality of connecting pads being connected to the plurality of electrode pads are formed, and a bending process is performed so that a pad formed part, which the plurality of connecting pads are formed, is not in contact with the projection to secure a height difference between a position of the projection and a position of the pad formed part.

Further, the present invention provides a hard disk drive including a head gimbal assembly having a thermally assisted magnetic recording head slider, and a magnetic recording medium opposing the thermally assisted magnetic recording head slider, the thermally assisted magnetic recording head slider including: a light source unit having a light emitting element emitting laser light and a submount holding the light emitting element; and a slider including a thin-film laminated part having a main magnetic pole layer, a near-field light generating element and an optical waveguide; a combination of the light emitting element and the near-field light generating element is comprised of a first optical pattern which includes a TE mode LD, which emits Laser light with TE mode, and TM mode PG corresponding to laser light with TM mode or a second optical pattern which includes a TM mode LD, which emits laser light with TM mode, and TE mode PG corresponding to laser light with TE mode, the light source unit is mounted on a light source placing surface, of the slider, arranged rear side of the medium-opposing surface opposing a magnetic recording medium, so that a substrate surface of the light emitting element are orthogonal to a laminated surface of the thin film laminated part, the slider has a plurality of electrode pads formed on an outer end surface of the thin film laminated part side, the light source unit includes a first element electrode and a second element electrode for applying voltage to the light emitting element, and the slider has a first connecting wiring part and a second connecting wiring part, formed on the light source placing surface, which connect the first element electrode and second element electrode with a first electrode pad and a second electrode pad of the plurality of electrode pads and insulated each other.

The present invention will be more fully understood from the detailed description given hereinbelow and the accompanying drawings which are given by way of illustration only, and thus are not to be considered as limiting the present invention.

DETAILED DESCRIPTION OF THE EMBODIMENTS

In the following, embodiments of the present invention will be described with reference to the drawings. Note that the same components will be referred to with the same numerals or letters, while omitting their overlapping descriptions.

(Structure of HGA)

Figure 1:
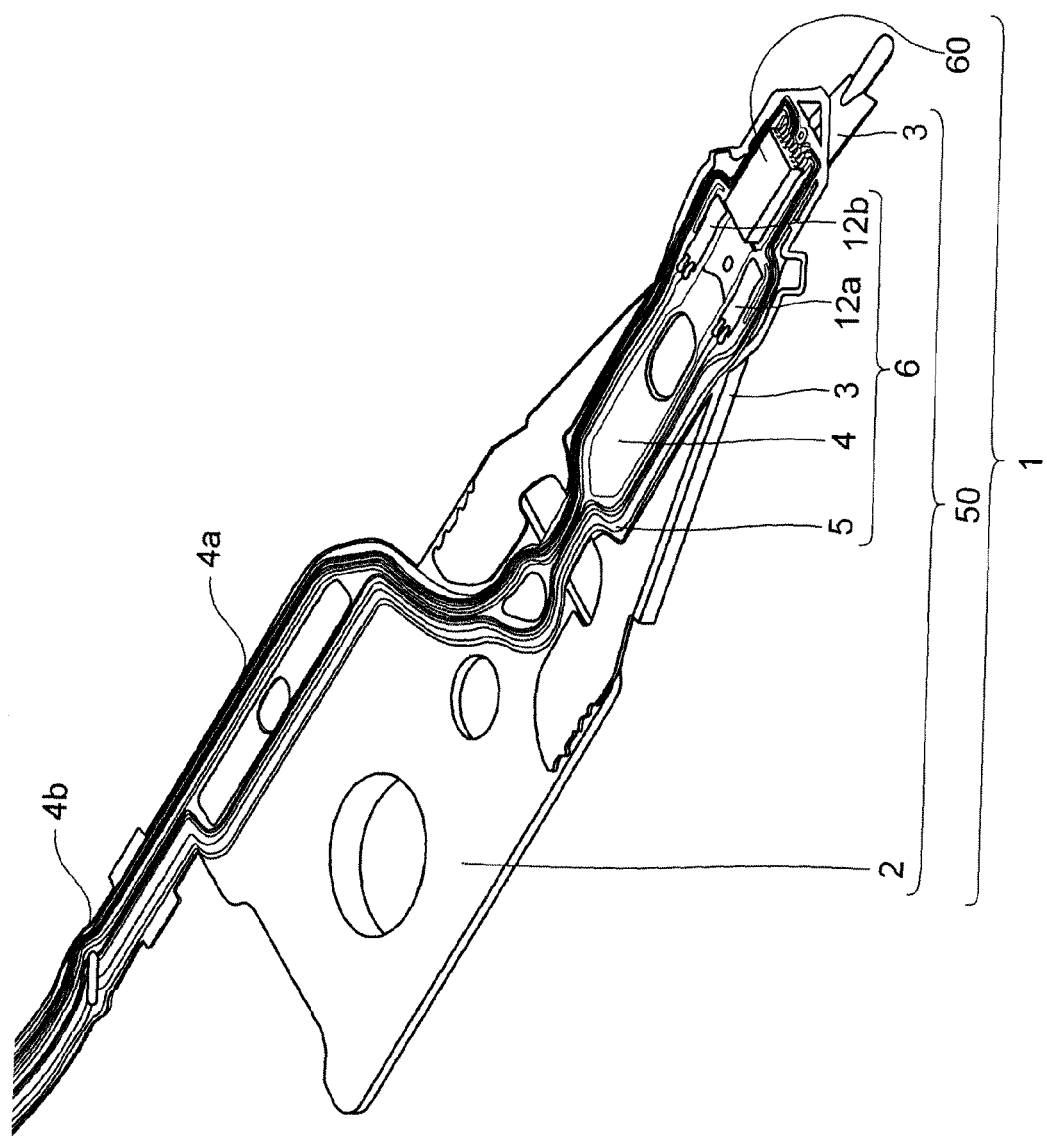
FIG. 1 is a perspective view showing the HGA entirely, from front side, according to an embodiment of the present invention.
Figure 2:
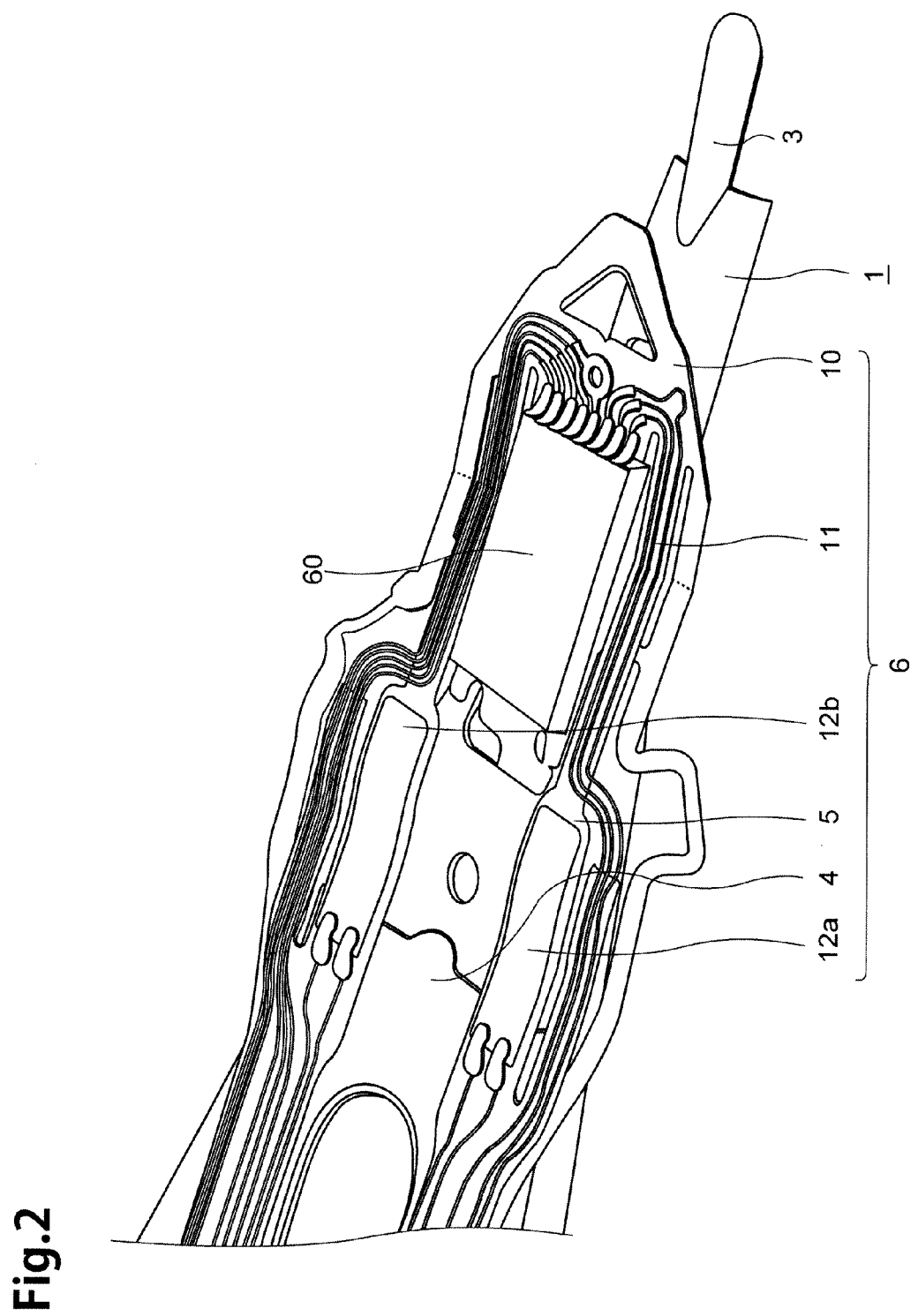
FIG. 2 is a perspective view showing, from front side, a principal part of the HGA in FIG. 1.
Figure 3:
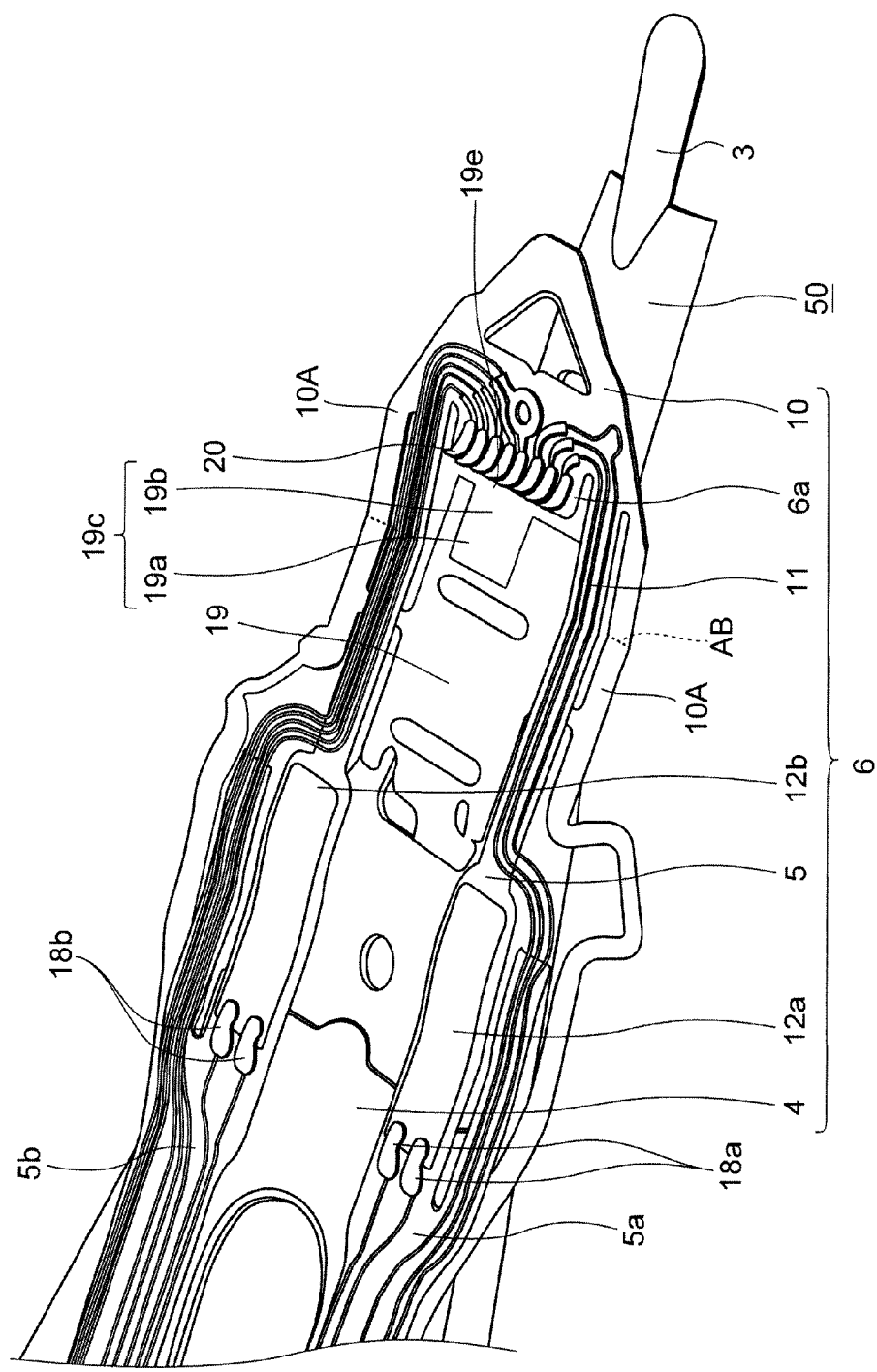
FIG. 3 is a perspective view showing, from front side, a principal part of the suspension constituting the HGA in FIG. 1.
Figure 4:
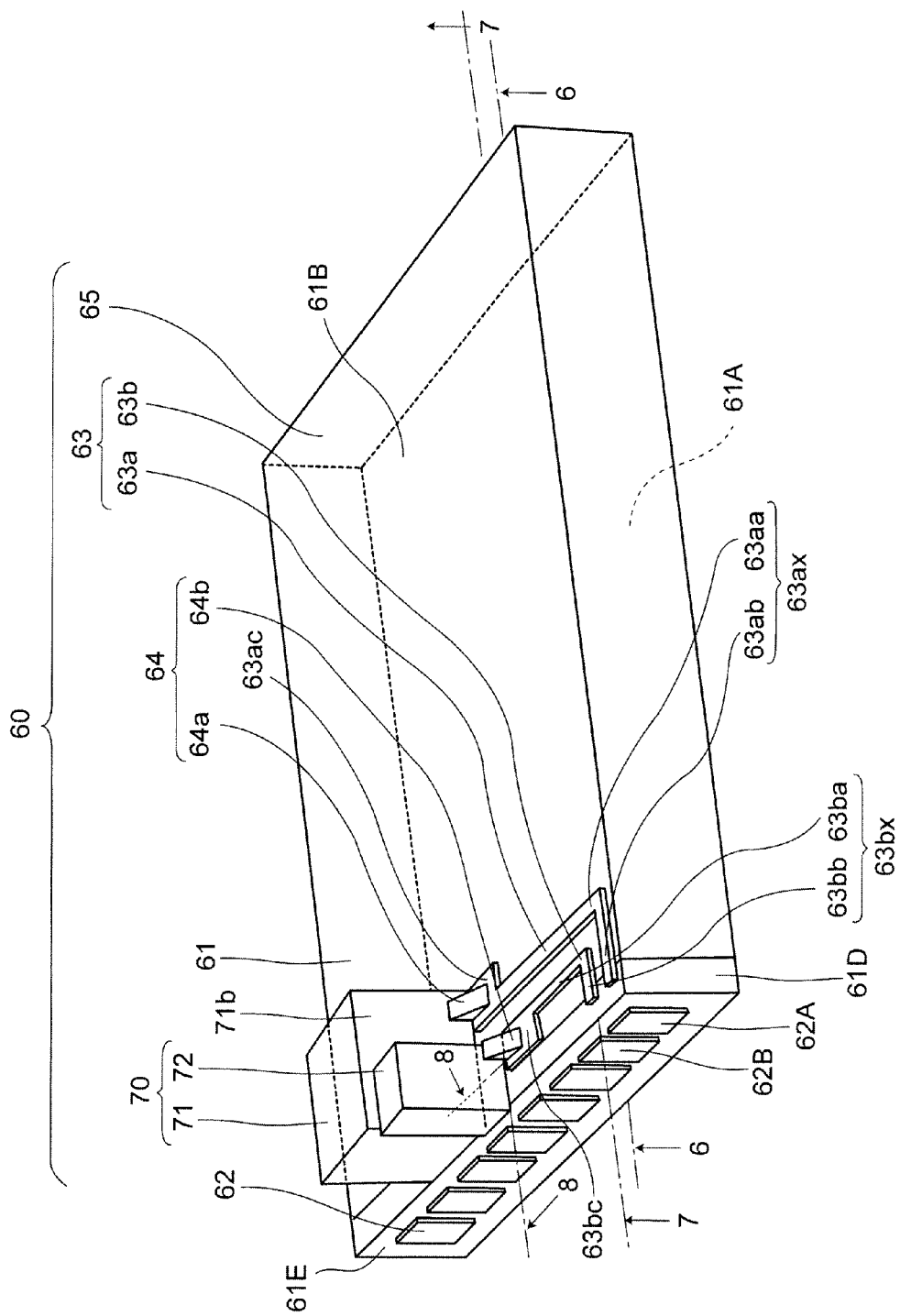
FIG. 4 is a perspective view showing, from a light source placing surface side, the thermally assisted magnetic recording head slider mounted on the HGA in FIG. 1.
Figure 5:
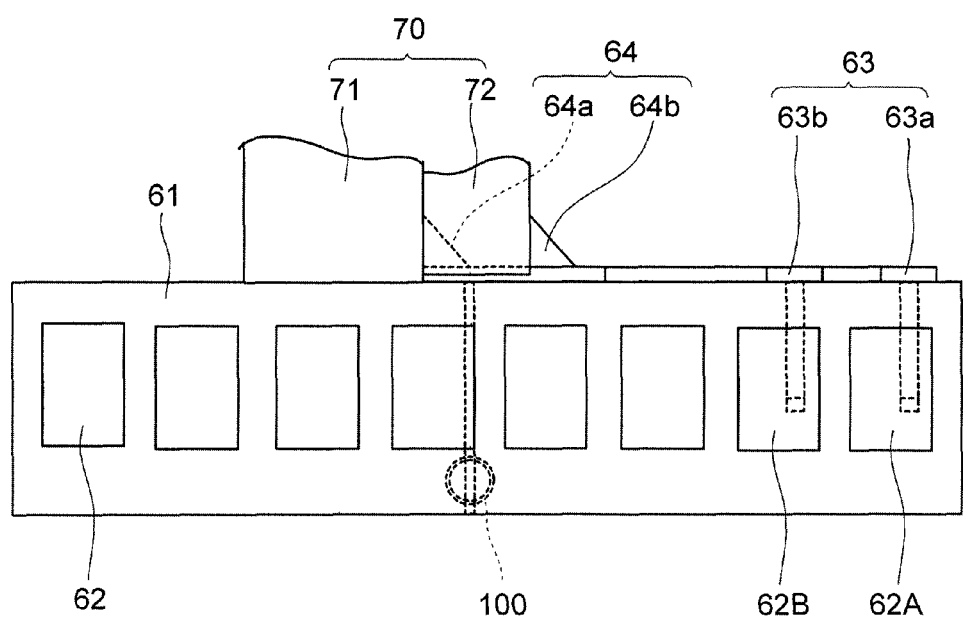
FIG. 5 is a front view showing the thermally assisted magnetic recording head slider mounted on the HGA in FIG. 1.

To begin with, a structure of the HGA according to the embodiment of the present invention will be explained with reference to FIG. 1 to FIG. 5. Here, FIG. 1 is a perspective view showing the HGA 1 entirely, from front side, according to an embodiment of the present invention. FIG. 2 is a perspective view showing, from front side, a principal part of the HGA 1. FIG. 3 is a perspective view showing, from front side, a principal part of the suspension 50 constituting the HGA 1. FIG. 4 is perspective view showing, from a light source placing surface 61 side, the thermally assisted magnetic recording head slider 60 mounted on the HGA 1. FIG. 5 is a front view showing the thermally assisted magnetic recording head slider 60 mounted on the HGA 1.

As illustrated in FIG. 1, the HGA 1 has the suspension 50 and the thermally assisted magnetic recording head slider (hereinafter, referred to also as "TAMR head slider") 60. The suspension 50 has a base plate 2, a load beam 3, the flexure 6 and a dumper not illustrated, and it has a structure which these parts are joined to be united one body by a weld and so on.

The base plate 2 is a part which is used to fix the suspension 50 to a drive arms 309 of a later-described hard disk drive 301, and it is formed with a metal such as stainless steel or the like.

The load beam 3 is fixed on the base plate 2. The load beam 3 has a shape in which the width gradually decreases as it is distanced more from the base plate 2. The load beam 3 has a load bending part which generates a power for pressing the TAMR head slider 60 against the later-described hard disk 302 of the hard disk drive 301.

Further, as illustrated in FIG. 1 to FIG. 3, the flexure 6 has a flexure substrate 4, a base insulating layer 5, a connecting wiring 11 and thin-film piezoelectric material elements 12a, 12b. The flexure 6 has a structure which the base insulating layer 5 is formed on the flexure substrate 4, the connecting wiring 11 and thin-film piezoelectric material elements 12a, 12b are adhered on the base insulating layer 5. Further, a protective insulating layer not illustrated is formed so as to cover the connecting wiring 11 and thin-film piezoelectric material elements 12a, 12b.

The flexure 6 has a piezoelectric elements attached structure which thin-film piezoelectric material elements 12a, 12b are fixed on the surface of the base insulating layer 5 in addition to the connecting wiring 11 to become a structure with piezoelectric element.

Further, the flexure 6 has a gimbal part 10 on the tip side (load beam 3 side). A tongue part 19, which the TAMR head slider 60 is mounted, is secured on the gimbal part 10, and a plurality of connecting pads 20 are formed near an edge side than the tongue part 19. Connecting pads 20 are electrically connected to later-described electrode pads 62 of the TAMR head slider 60. As illustrated in FIG. 3 in detail, out trigger parts 10A, 10A are formed outside the tongue part 19 of the gimbal part 10. A bending process is performed to out trigger parts 10A, 10A. The bending process is performed so that parts, of out trigger parts 10A, 10A, on tip side (connecting pad 20 side) more than a bending line AB face to the slanting upward direction. Further, by the bending process, part, of gimbal part 10, which are connected with out trigger parts 10A, 10A and part, which connecting pads 20 are formed (pad formed part 6a), are arranged in the slanting upward direction (so as to approach the TAMR head slider 60). In accordance with the above structure, tip side parts of connecting wirings 11 and base insulating layer 5 more than the bending line AB are arranged in the slanting upward direction. However, the bending process is not performed to the tongue part 19. Therefore, difference of the up-down direction (height difference hd) is secured between a position of a projection 72g of the LD 72 and a position of the pad formed part 6a (see FIG. 24). Contact of the projection 72g and pad formed part 6a is avoided by the securing the height difference hd.

A passing hole 19c is formed in the tongue part 19. A later-described LD unit 70 of the TAMR head slider 60 is inserted into the passing hole 19c. The passing hole 19c has a submount passing hole 19a and a LD passing hole 19b. The submount passing hole 19a is a hole corresponding to a submount 71 of the LD unit 70, and the passing hole 19b is a hole corresponding to a LD 72.

The flexure 6 expands or shrinks thin-film piezoelectric material elements 12a, 12b and expands or shrinks out trigger parts 10A, 10A jut out outside of the tongue part 19. That makes a position of the TAMR head slider 60 move very slightly around not-illustrated dimple, and a position of the TAMR head slider 60 is controlled minutely.

The flexure substrate 4 is a substrate for supporting the flexure 6 entirely, and it is formed with stainless. Rear side of the flexure substrate 4 is fixed to the base plate 2 and the load beam 3 by weld. As illustrated in FIG. 1, the flexure substrate 4 has a center part 4a fixed to surfaces of the load beam 3 and the base plate 2, and a wiring part 4b extending to outside from the base plate 2.

The base insulating layer 5 covers surface of the flexure substrate 4. The base insulating layer 5 is formed with for example polyimide, and it has a thickness of about 5 μm to 10 μm. Further, as illustrated in detail in FIG. 3, a part of the base insulating layer 5, disposed on the load beam 3, is divided two parts. One part of them is a first wiring part 5a, the other part of them is a second wiring part 5b. The thin-film piezoelectric material element 12a and thin-film piezoelectric material element 12b are adhered on surfaces of each wiring part.

A plurality of connecting wirings 11 are formed on surfaces of each of the first wiring part 5a and the second wiring part 5b. Each connecting wiring 11 is formed with conductor such as copper or the like. One end parts of each connecting wiring 11 are connected to the thin-film piezoelectric material elements 12a, 12b or each connecting pad 20.

(Structure of TAMR Head Slider 60)

Figure 6:
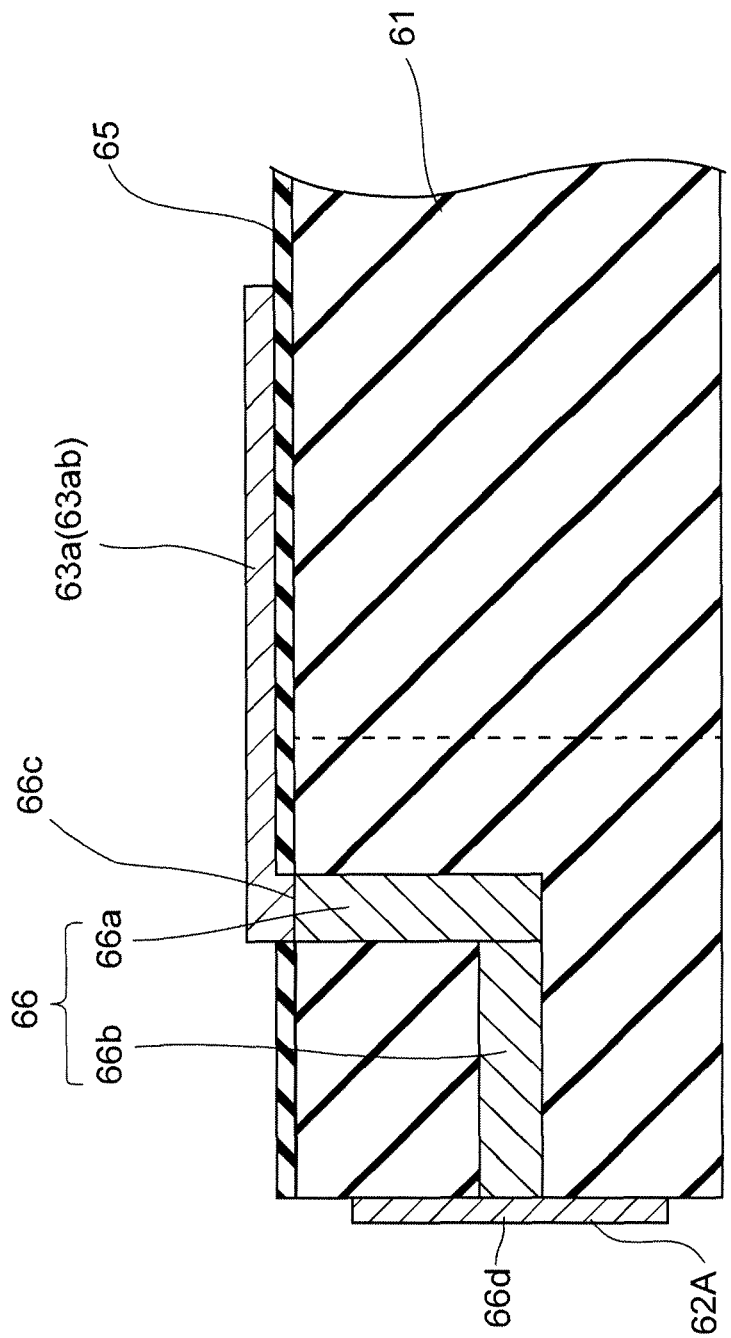
FIG. 6 is a sectional view taken along the line 6-6 in FIG. 4 with a part thereof omitted.
Figure 7:
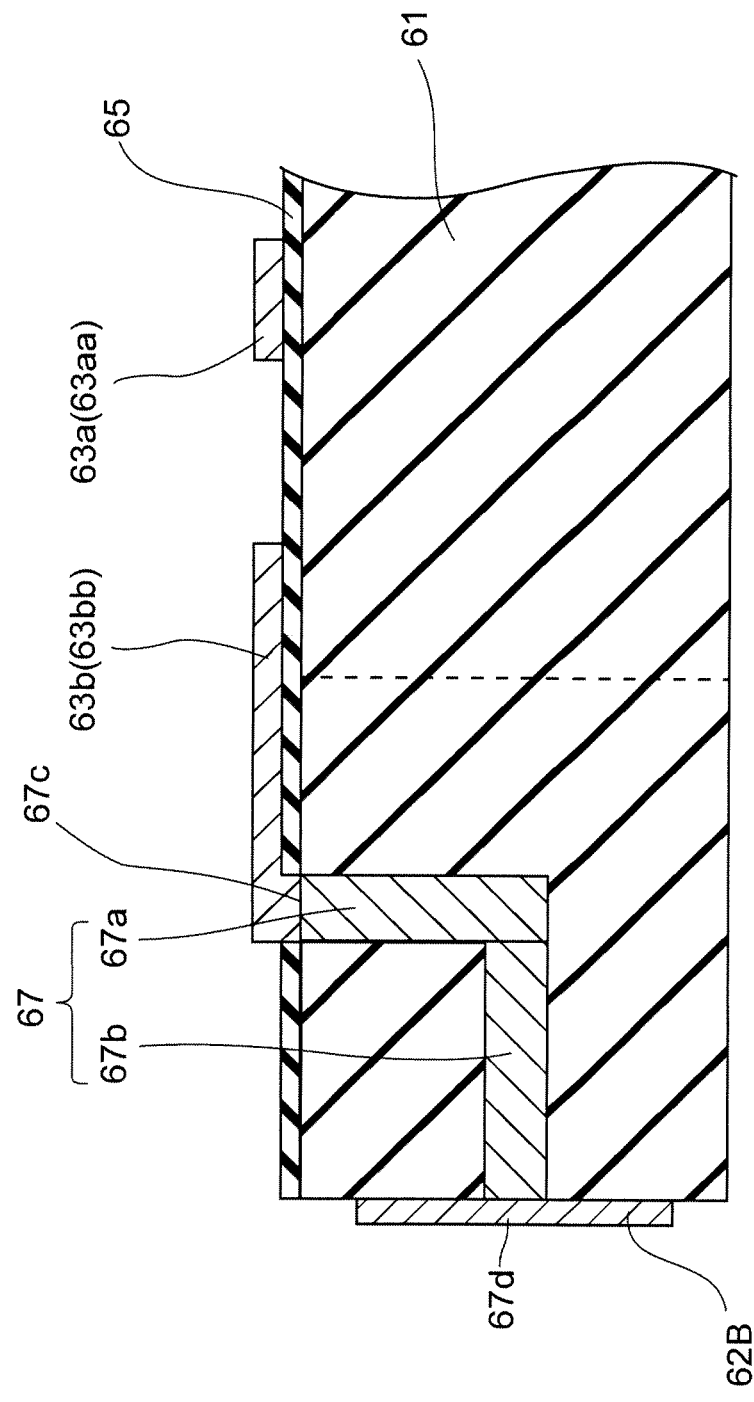
FIG. 7 is a sectional view taken along the line 7-7 in FIG. 4 with a part thereof omitted.
Figure 8:
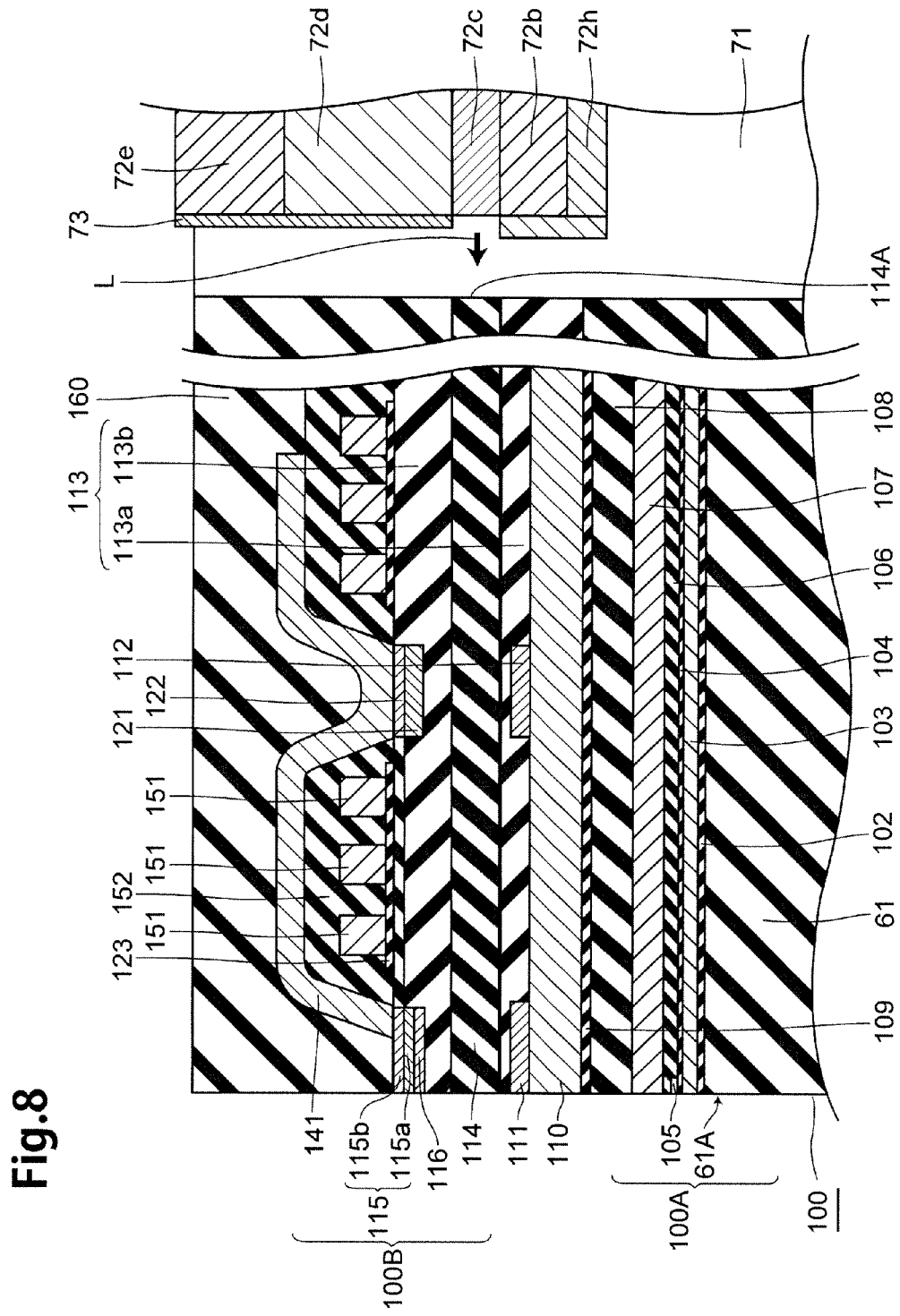
FIG. 8 is a sectional view showing a thin-film magnetic head taken along the line 8-8 intersecting a medium-opposing surface.
Figure 9:
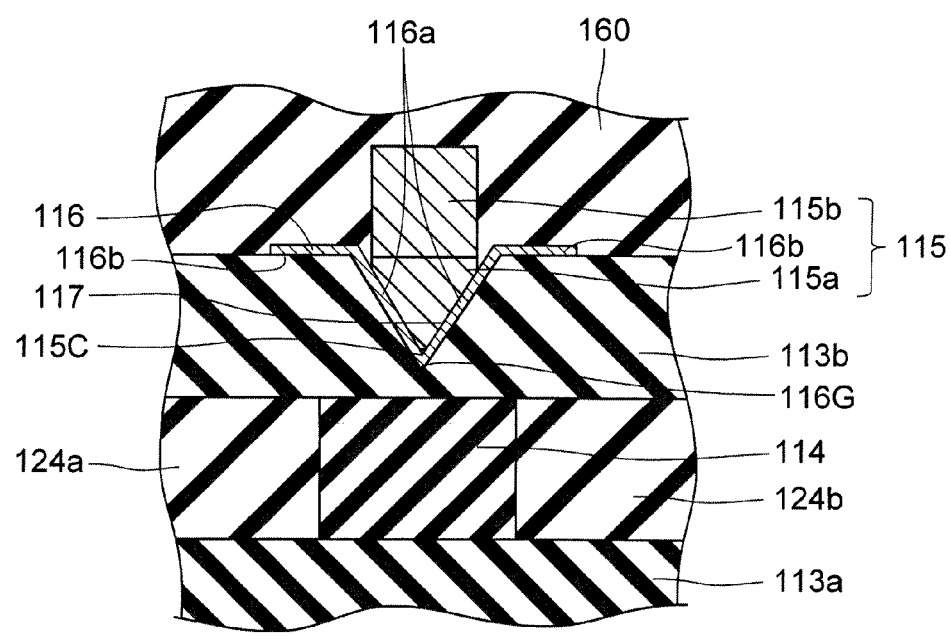
FIG. 9 is a front view showing principal part of the medium-opposing surface of a thin-film magnetic head.

Subsequently, the structure of the TAMR head slider 60 will be explained with reference to FIG. 6 to FIG. 9 in addition to FIG. 4, FIG. 5. Here, FIG. 6 is a sectional view taken along the line 6-6 in FIG. 4 with a part thereof omitted. FIG. 7 is a sectional view taken along the line 7-7 in FIG. 4 with a part thereof omitted. FIG. 8 is a sectional view showing a thin-film magnetic head 100 taken along the line 8-8 along an ABS 61A. FIG. 9 is a front view showing principal part of the ABS 61A of the thin-film magnetic head 100.

The TAMR head slider 60 has a slider 61, the LD unit 70, a plurality of electrode pads 62, wiring electrodes 63, conductive pads 64 and a cover insulating layer 65. The TAMR head slider 60 is comprised of a first optical pattern. The optical pattern means a combination of the later-described LD 72 and PG 116, in this embodiment. In case of the first optical pattern, the LD 72 is the TE mode LD which laser light L is emitted with TE mode, and the PG 116 is the TM mode PG corresponding to laser light L of TM mode.

The slider 61 is formed in a rectangular parallelepiped shape. The slider 61 is formed of a ceramic material such as aluminum oxide-titanium carbide ($Al_2O_3.TiC$) or the like.

The slider 61 has the ABS 61A as a medium-opposing surface opposing a magnetic recording medium, a light source placing surface 61B arranged at rear side of the ABS 61A and a thin-film laminated part 61D.

As illustrated in FIG. 8, FIG. 9, a later-described main magnetic pole layer 115, PG (near-field light generating element) 116, optical waveguide 114 and a reproducing element 105, which are included in the thin-film magnetic head 100, are arranged in the ABS 61A. The thin-film magnetic head 100 has a reproducing head 100A including the reproducing element 105 and a later-described recording head 100B including the main magnetic pole layer 115, PG116 and the optical waveguide 114. The thin-film magnetic head 100 will be explained later in detail.

The LD unit 70 is mounted on the light source placing surface 61B. The LD unit 70 is mounted on the light source placing surface 61B so that a substrate surface 72f (see FIG. 19) of the LD 72 as a light emitting element are orthogonal to a laminated surface of the thin-film laminated part 61D. The thin-film magnetic head 100 is formed in the thin-film laminated part 61D using a thin-film forming process.

Further, wiring electrodes 63, conductive pads 64 and the cover insulating layer 65 are formed on the light source placing surface 61B. Wiring electrodes 63 have first, second wiring electrodes 63a, 63b. Conductive pads 64 have first, second conductive pads 64a, 64b. The first, second wiring electrodes 63a, 63b, first, second conductive pads 64a, 64b and later-described first, second lead electrodes 66, 67 constitute respectively first, second connecting wiring parts according to the embodiment of the present invention.

Then, first, second connecting wiring parts connect respectively later-described first, second element electrodes 71a, 72a (see FIG. 19) with later-described first, second electrode pads 62A, 62B. Further, first, second connecting wiring parts are insulated each other.

The first connecting wiring part has the first wiring electrodes 63a, first conductive pad 64a and the first lead electrode 66. The first wiring electrode 63a is an electrode which connects the first conductive pad 64a with the first lead electrode 66. The first wiring electrode 63a is formed on the cover insulating layer 65 in the light source placing surface 61B. The conductive pad 64a is a member which connects the first element electrode 71a with the first wiring electrodes 63a. The first lead electrode 66 is connected to the first wiring electrode 63a and the first electrode pad 62A.

The second connecting wiring part has the second wiring electrodes 63b, second conductive pad 64b and the second lead electrode 67. The second wiring electrode 63b is an electrode which connects the second conductive pad 64b with the second lead electrode 67. The second wiring electrode 63b is also formed on the cover insulating layer 65.

The conductive pad 64b is a member which connects the second element electrode 72a with the second wiring electrodes 63b. The second lead electrode 67 is connected to the second wiring electrode 63b and the second electrode pad 62B.

First, second wiring electrodes 63a, 63b are formed on the cover insulating layer 65 using metal having good conductivity such as Cu, Au or the like. First, second wiring electrodes 63a, 63b have first, second band-shaped terminal parts 63ax, 63bx, and first, second wide-width terminal parts 63ac, 63bc respectively.

The first band-shaped terminal part 63ax has a first main terminal part 63aa and a first sub terminal part 63ab. The second band-shaped terminal part 63bx has a second main terminal part 63ba and a second sub terminal part 63bb.

The first, second main terminal parts 63aa, 63ba are part which extend on the straight, from the first, second wide-width terminal parts 63ac, 63bc, along by later-described outer end surface 61E respectively. The first, second sub terminal parts 63ab, 63bb are part which extend on the straight, toward the outer end surface 61E, along by a direction orthogonally intersecting with the first, second main terminal parts 63aa, 63ba respectively. As illustrated in FIG. 6, 7, the first, second sub terminal parts 63ab, 63bb are connected with the first, second lead electrodes 66, 67.

First, second wide-width terminal parts 63ac, 63bc are formed on first, second conductive pads 64a, 64b sides (light source unit area 76 side) of first, second band-shaped terminal parts 63ax, 63bx. First, second wide-width terminal parts 63ac, 63bc have widths lager than those of first, second band-shaped terminal parts 63ax, 63bx, and first, second conductive pads 64a, 64b are formed on their surfaces.

First, second lead electrodes 66, 67 have first, second inner electrodes 66a, 67a and first, second pad connecting electrodes 66b, 67b, respectively. First, second inner electrodes 66a, 67a are connected with first, second wiring electrodes 63a, 63b (first, second sub terminal part 63ab, 63bb) and first, second pad connecting electrodes 66b, 67b respectively. First, second inner electrodes 66a, 67a are formed inside the thin-film laminated part 61D, along the direction connecting the light source placing surface 61B and the ABS 61A, and their end surfaces 66c, 67c are exposed in the light source placing surface 61B.

First, second pad connecting electrodes 66b, 67b are connected with first, second inner electrodes 66a, 67a and first, second electrode pads 62A, 62B respectively. First, second pad connecting electrodes 66b, 67b are formed inside the thin-film laminated part 61D, along the direction intersecting with first, second inner electrodes 66a, 67a, and their pad end surfaces 66d, 67d are exposed in the outer end surface 61E.

First, second conductive pads 64a, 64b are formed with SBB (Solder Ball Bonding), GBB (Gold Ball Bonding) or conductive resin.

A plurality of electrode pads 62 are formed in the outer end surface 61E. The outer end surface 61E is outer surface of the thin-film laminated part 61D, are referred to as trailing edge surface. First, second electrode pads 62A, 62B among the plurality of electrode pads 62 are in touch with pad end surfaces 66d, 67d of first, second pad connecting electrodes 66b, 67b. Each electrode pad 62 is connected to each connecting pad 20, thereby the suspension 50 and the TAMR head slider 60 are connected.

Figure 19:
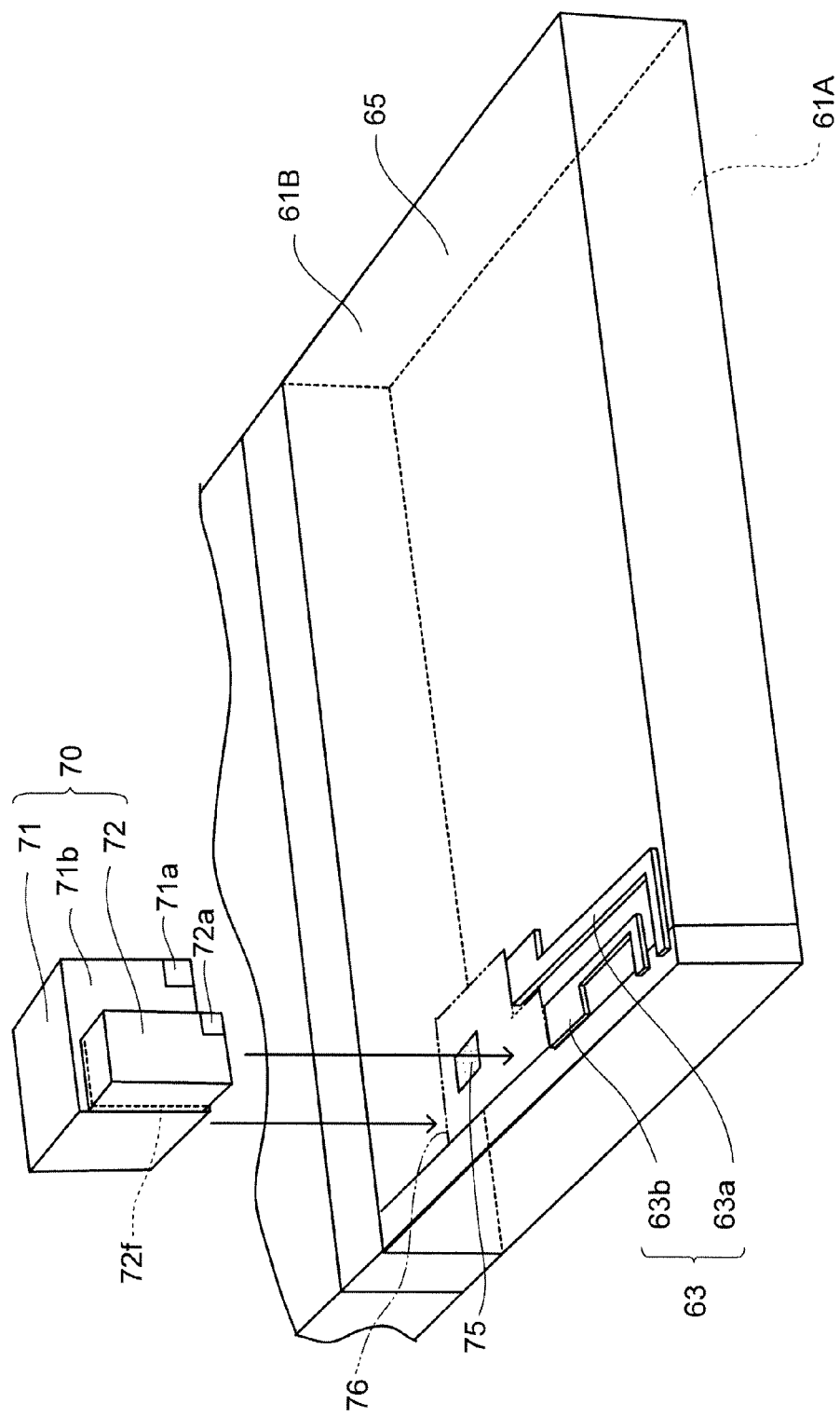
FIG. 19 is a perspective view, similar to FIG. 4, showing a step subsequent to that in FIG. 15.

The LD unit 70 has the submount 71 and the LD 72. The submount 71 is a member for holding the LD 72 as a light emitting element. The submount 71 is formed in a rectangular parallelepiped shape with a ceramic material such as aluminum oxide-titanium carbide ($Al_2O_3.TiC$) or the like. Side surface, intersecting to the outer end surface 61E, of the submount 71 is a holding surface 71b, and the LD 72 is fixed on the holding surface 71b. Further, as illustrated in FIG. 19, the first element electrode 71a is formed in the holding surface 71b. The first element electrode 71a is connected one electrode layer (upper electrode layer 72e, see FIG. 8) for applying voltage to the LD 72.

The LD 72, as illustrated in FIG. 8, has a lower electrode layer 72h, a n-type semiconductor layer 72b, an active layer 72c, a p-type semiconductor layer 72d, an upper electrode layer 72e and a reflecting layer 73. The LD 72 is TE mode LD which emits laser light L with TE mode. The lower electrode layer 72h is an electrode for applying voltage to the LD 72, and it is connected to the second element electrode 72a. The n-type semiconductor layer 72b is formed with semiconductor such as n-type AlGaN or the like. Laser light L is emitted from the active layer 72c. The p-type semiconductor layer 72d is formed with semiconductor such as p-type AlGaN or the like. The upper electrode layer 72e is an electrode for applying voltage to the LD 72, and it is connected to the first element electrode 71a of the submount 71.

The LD 72 is arranged in a position slightly separated from the light source placing surface 61B. Further, a projection 72g is formed in the outer end surface 61E side (see FIG. 15). The projection 72g is a part which project slightly than the submount 71.

(Structure of Thin-Film Magnetic Head 100)

Subsequently, the structure of the thin-film magnetic head 100 will be explained with reference to FIG. 8, FIG. 9. The thin-film magnetic head 100 has the reproducing head 100A and the recording head 100B. The thin-film magnetic head 100 has a structure which the reproducing head 100A and the recording head 100B are laminated.

The reproducing head 100A has an MR device 105, arranged near the ABS 61A, for detecting a magnetic signal. Further, The reproducing head 100A comprises an insulating layer 102, a lower shield layer 103, a lower shield gap film 104, an upper shield gap film 106 and an upper shield layer 107.

Figure 21:
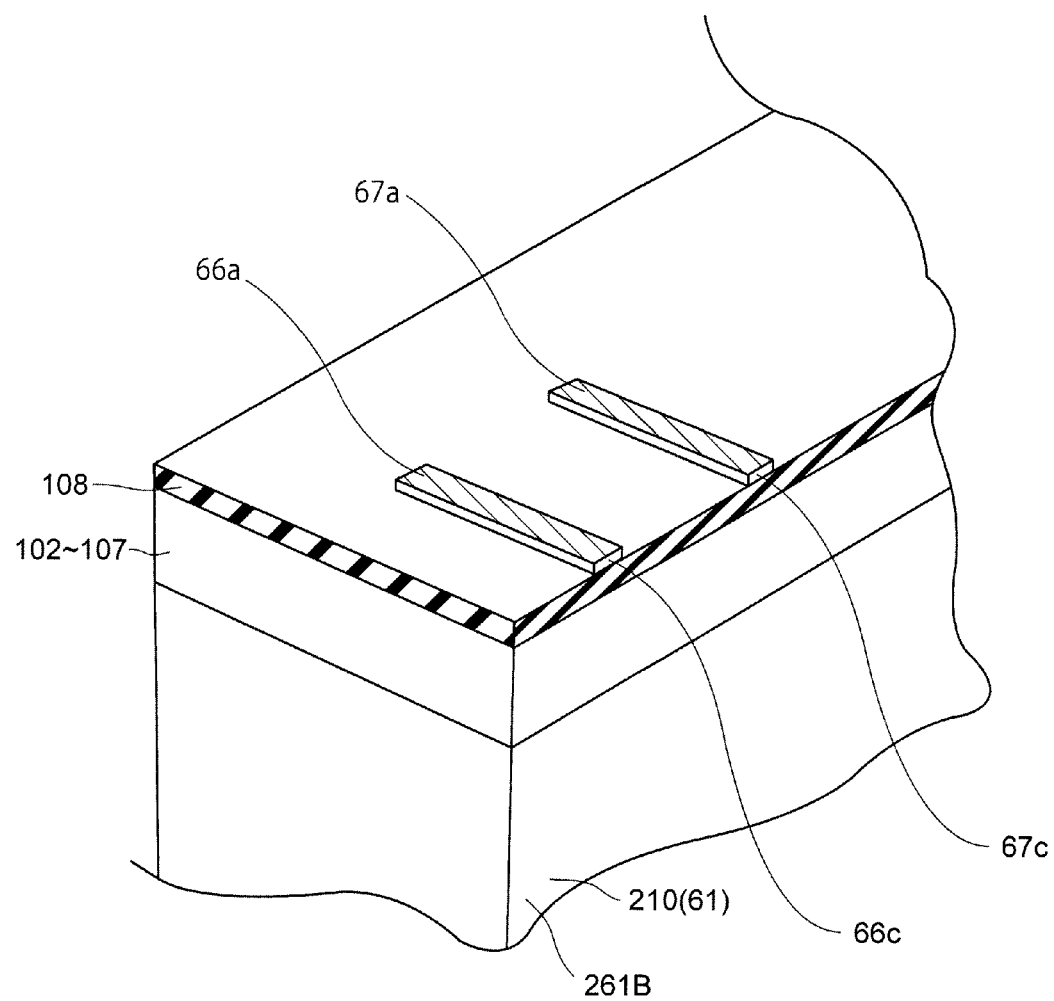
FIG. 21 is a perspective view showing a principal part of a lead electrode forming step.

The insulating layer 102 is formed on the surface, of the thin-film laminated part 61D side, of the slider 61, and the lower shield layer 103 made of a magnetic material is formed on the insulating layer 102. Further, the lower shield gap film 104 as an insulating film is further formed on the lower shield layer 103, and the upper shield gap film 106 shielding the MR device 105 is formed on the lower shield gap film 104. The upper shield layer 107 made of a magnetic material is formed on the upper shield gap film 106, and insulating layers 108, 109 are formed on the upper shield layer 107. Furthermore, as illustrated in FIG. 21, 22, the above-described first, second inner electrodes 66a, 67a are formed in the insulating layer 108. The insulating layer 109 is formed so as to cover the first, second inner electrodes 66a, 67a.

The MR device 105 is constituted by a magnetosensitive film exhibiting a magnetoresistive effect, such as AMR (anisotropic magnetoresistive), GMR (giant magnetoresistive), and TMR (tunneling magnetoresistive) devices.

The GMR device may be of a CIP (Current In Plane) type or a CPP (Current Perpendicular to Plane) type. In the CIP type, current for detecting a magnetic signal flows in a direction almost parallel to planes of the layers constituting the GMR device. In the CPP type, current for detecting a magnetic signal flows in a direction almost perpendicular to planes of the layers constituting the GMR device.

Next, the structure of the recording head 100B will be explained. The recording head 100B is used for recording data on a recording surface of the hard disk 302. The recording head 100B has a lower yoke layer 110, a leading shield layer 111, a linking magnetic layer 112, the optical waveguide 114, the main magnetic pole layer 115, a near-field light generating part (also called plasmon generator, "PG") 116, linking magnetic pole layers 121, 122, an upper yoke layer 141, and a thin-film coil 151, and has a structure in which they are stacked on the slider 61.

The leading shield layer 111 is formed ABS 61A side of the lower yoke layer 110. The end surface of the leading shield layer 111 is arranged in the ABS 61A (not illustrated in FIG. 9). The linking magnetic layer 112 is formed rear side of the lower yoke layer 110.

The optical waveguide 114 is a member which guides laser light L from the light source placing surface 61B to ABS 61A side so that laser light L, emitted from the LD 72, is irradiated to the PG 116. The optical waveguide 114 is formed using a dielectric substance which transmits laser light L, such as SiC, DLC, TiO$_x$, SiN$_x$, Ta$_2$O$_5$ or the like and it is formed so as to be sandwiched in a clad layer 113. Further, end surface of the optical waveguide 114 is arranged in the ABS 61A. Laser light L is irradiated to the rear end surface 114A.

The clad layer 113 has a first clad layer 113a, arranged near slide 61 side than the optical waveguide 114, and a second clad layer 113a, arranged outside than the optical waveguide 114. The clad layer 113 is formed using a dielectric substance having a lower refractive index than that of the optical waveguide 114, and for example, using alumina (Al$_2$O$_3$).

The near-field light generating part 116 is made of metal and formed of, for example, one of Au, Ag, Al, Cu, Pd, Pt, Rh, Ir or an alloy made of a plurality of those elements.

The near-field light generating part 116 has two in-groove generating parts 116a, 116a, two extended parts 116b, 116b, and is constituted of them connected in one body. In this near-field light generating part 116, one in-groove generating parts 116a and the other in-groove generating parts 116a are connected via an acute end part 116G, and extended parts 116b, 116b are connected with both side of respective in-groove generating parts 116a, 116a. V-figure bend structure is formed with two in-groove generating parts 116a, 116a and the acute end part 116G. A groove part 117 having a section in a V-shape is formed with two in-groove generating parts 116a, 116a and the acute end part 116G, and later-described in-groove magnetic pole layer 115a is formed in the groove part 117.

The main magnetic pole layer has the in-groove magnetic pole layer 115a and the upper magnetic pole layer 115b. The main magnetic pole layer 115 is made of a magnetic material such as CoNiFe, CoFe, NiFe, CoFeN or the like. The main magnetic pole layer 115 has a symmetrical structure formed to be bilaterally symmetrical about a front end part 115c and edge part arranged rear side of it. The in-groove magnetic pole layer 115a is formed inside the groove part 117. Both side of the in-groove magnetic pole layer 115a, along the width direction, is surrounded by in-groove generating parts 116a and 116a. The in-groove magnetic pole layer 115a has a tapered shape with a width gradually getting smaller according to the groove part 117. The in-groove magnetic pole layer 115a has a downward triangle pillar like part in which the sharp edge part faces the optical waveguide 114 side.

The upper magnetic pole layer 115b is formed outside the groove part 117. The upper magnetic pole layer 115b is formed in a rectangular parallelepiped shape. The upper magnetic pole layer 115b has a magnetic pole end part arranged in the ABS 61A. The upper yoke layer 141 is connected to the surface of the upper magnetic pole layer 115b.

The upper yoke layer 141 has a curved structure extending from a position separated from the ABS 61A along the width direction and leading to the linking magnetic pole layer 122 straddling the thin-film coil 151. Linking magnetic pole layer 121 is connected to the Linking magnetic pole layer 121. Linking magnetic pole layers 121,122 are arranged in a manner to hold the optical waveguide 114 from both right and left sides at a position separated from the ABS 61A than are the thin-film coil 151. Linking magnetic pole layers 121, 122 are connected to the linking magnetic pole layer 112.

The thin-film coil 151 has three turn parts. The thin-film coil 151 is wound like a flat spiral about the upper yoke layer 141.

Four turn parts are arranged at respective positions having different distances from the ABS 61A. The respective turn four parts are insulated from each other by a photoresist 152. Four turn parts are formed on an insulating layer 123.

Further, when a current modulated according to data to be recorded on the magnetic recording medium flows through the thin-film coil 151, the thin-film coil 151 generates a recording magnetic field, in the recording head 100B.
(Operation Contents of Recording Head 100B)

Subsequently, the magnetic recording operation of the recording head 100B having the above structure will be explained as follows.

When a current modulated according to data to be recorded on the magnetic recording medium is caused to flow through the thin-film coil 151, the current generates a recording magnetic field. The recording magnetic field passes through the main magnetic pole layer 115, and a magnetic flux caused by the recording magnetic field is emitted from the end surface of the main magnetic pole layer 115, of the ABS 61A side, to the magnetic recording medium. With this magnetic flux, the data is recorded on the magnetic recording medium.

On the other hand, when the LD 72 generates laser light L, the laser light L are transmitted to the rear end surface 114A of the optical waveguide 114. The laser light L moves through the optical waveguide 114 to the ABS 61A. Since the clad layer 113 is formed so as to cover with the outer surface of the optical waveguide 114, and the near-field light generating part 116 is formed outside the clad layer 113, the laser light L is applied to the near-field light generating part via the clad layer 113.

Further, the clad layer 113 having a lower refractive index than that of optical waveguide 114 is in contact with the optical waveguide 114. Therefore, when laser light L enters the clad layer 113 having lower refractive index from the optical waveguide 114 having higher refractive index and are totally reflected, evanescent light seeps near the surface of the clad layer 113 having a lower refractive index. The use of the evanescent light makes it possible to match the phase speed thereof with the phase speed of surface plasmons and excite surface plasmon on the near-field light generating part 116.

The surface plasmons propagate to the acute end part 116G of the near-field light generating part 116. The acute end part 116G is end part of the in-groove generating part 116a, and the in-groove generating parts 116a, 116a cross each other with the acute end part 116G. Therefore, the surface plasmons are concentrated on the acute end part 116G. Then, a near-field light having a very high electric field intensity is generated near the acute end part 116G.

The near-field light is irradiated from the acute end part 116G to the magnetic recording medium and reaches the surface of the magnetic recording medium. Then, a limited extremely small region in the magnetic recording layer of the magnetic recording medium is intensively heated by the near-field light. In the magnetic recording layer, the coercive force reduces to an extent at which data is able to be recorded by the magnetic flux caused by the recording magnetic field.

In the recording head 100B, because the coercive force is able to be reduced in the above-described manner, data can be recorded also on a magnetic recording medium having a high coercive force for high-density recording.

(Method of Manufacturing TAMR Head Slider 60 and HGA 1)

Figure 10:
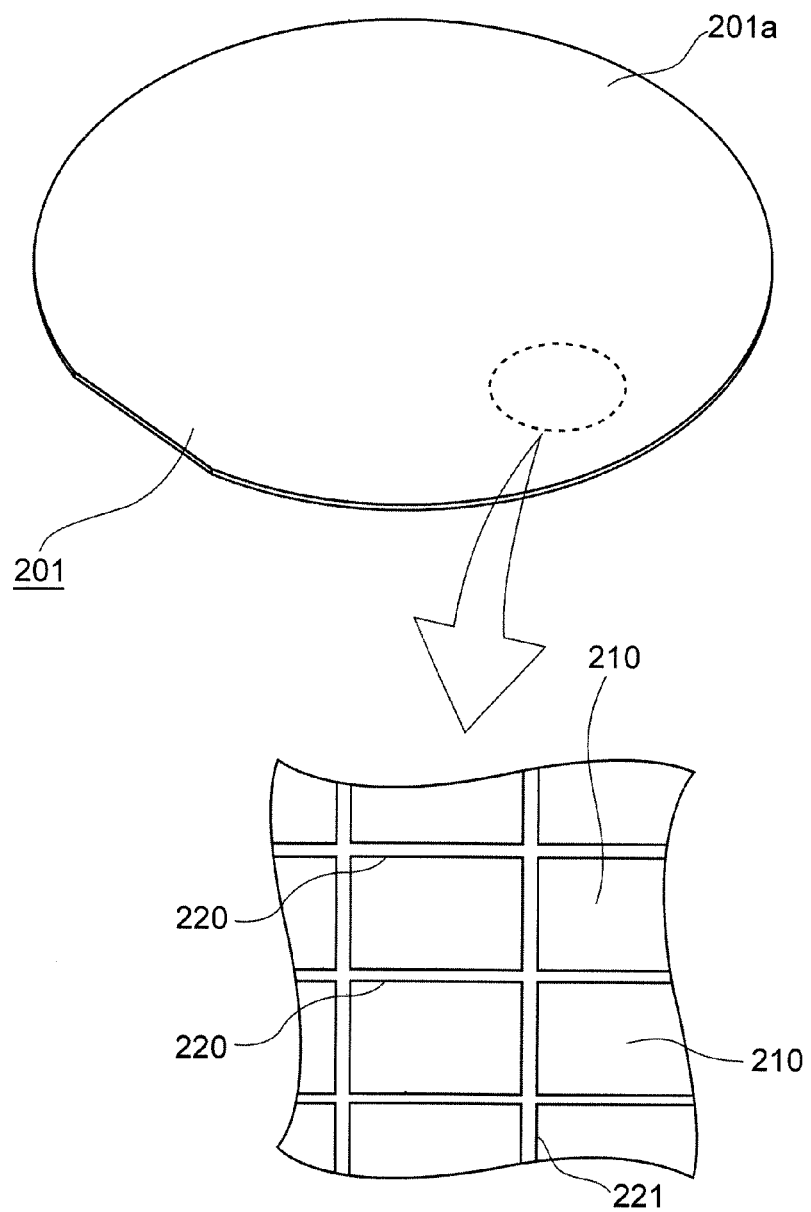
FIG. 10 is a perspective view showing entirely a wafer like substrate which the thermally assisted magnetic recording head sliders are formed.
Figure 11:
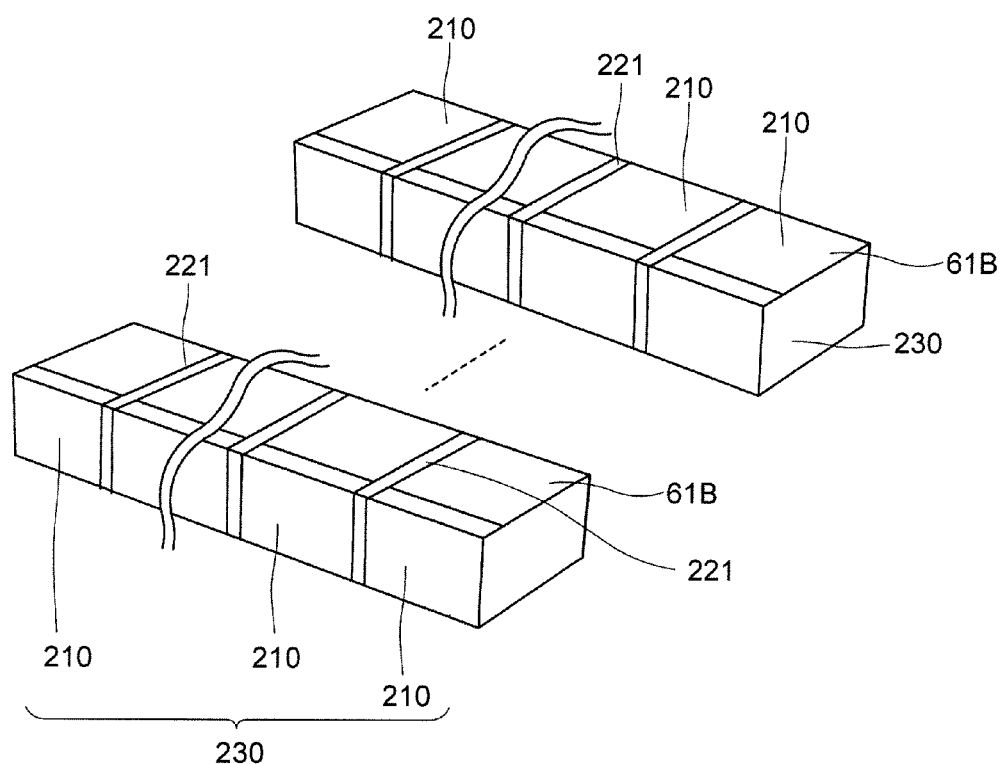
FIG. 11 is a perspective view showing a plurality of bar like members obtained from the wafer like substrate in FIG. 10.
Figure 20:
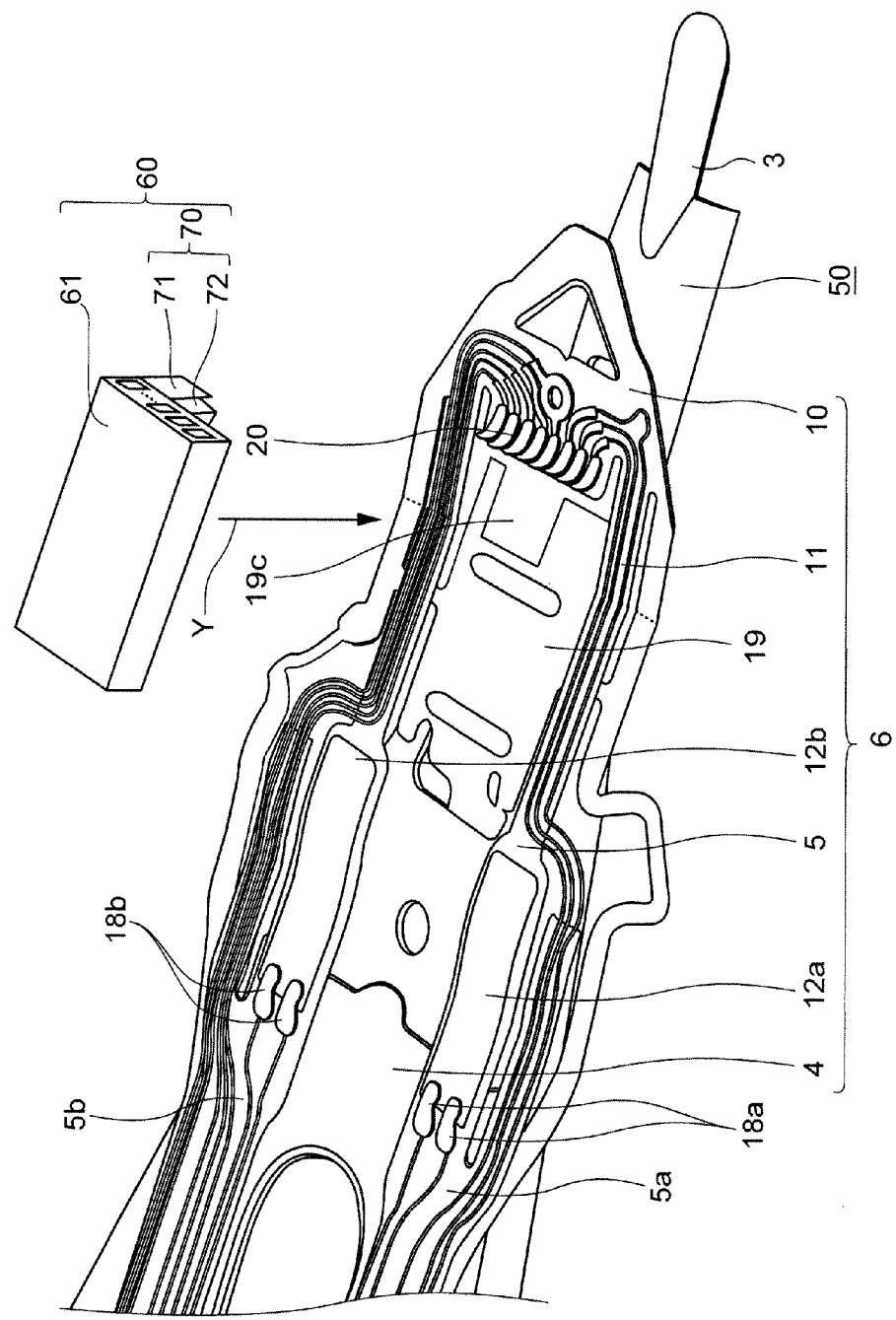
FIG. 20 is a perspective view, similar to FIG. 3, showing a step subsequent to that in FIG. 19.
Figure 22:
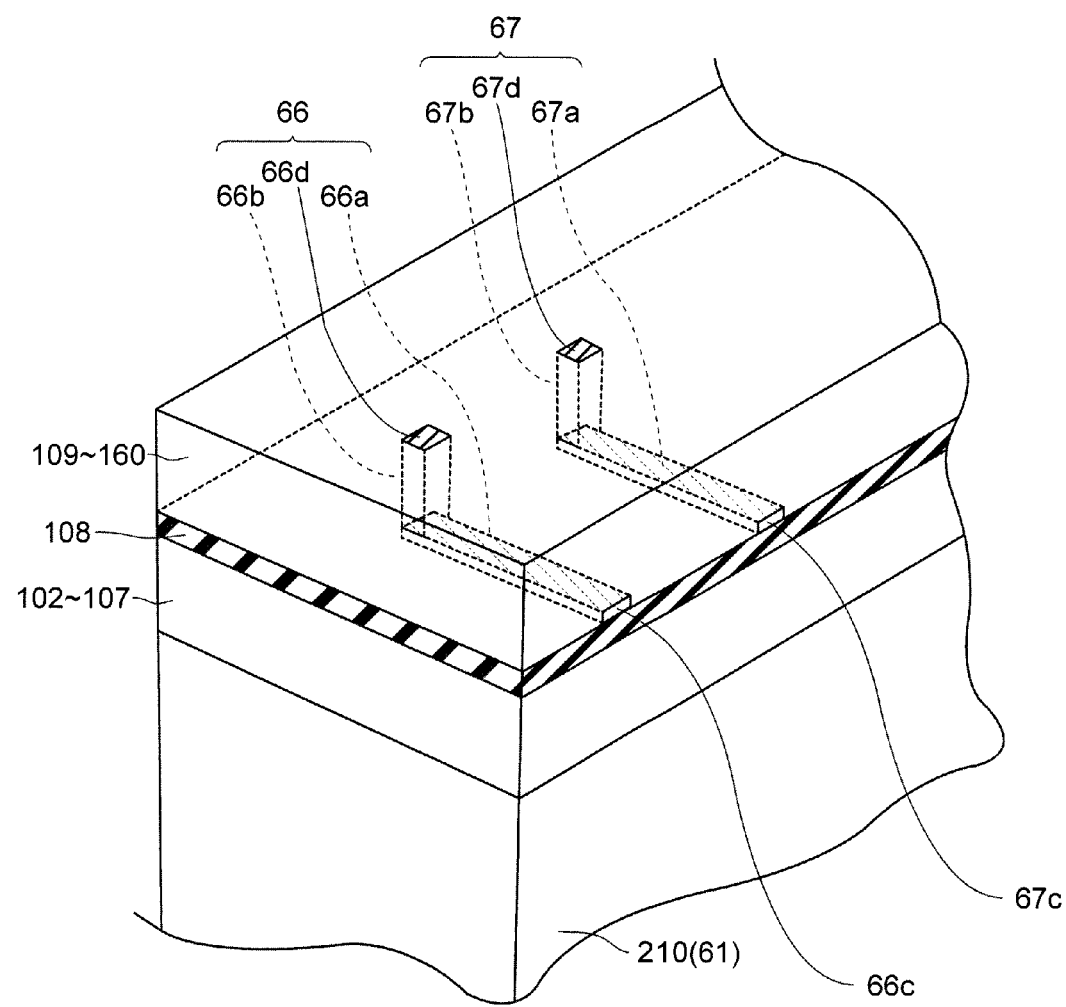
FIG. 22 is a perspective view showing a step subsequent to that in FIG. 21.

Next, a method of manufacturing the TAMR head slider 60 and HGA 1 having the structure mentioned above will now be explained with reference to FIG. 10 to FIG. 22 together with the above-described FIG. 1 to FIG. 9. Here, FIG. 10 is a perspective view showing entirely a wafer like substrate 201 which the TAMR head sliders 60 are formed. FIG. 11 is a perspective view showing a plurality of bar like members 230 obtained from the wafer like substrate 201. FIGS. 12-15 are plan views showing principal parts of the light source placing surfaces 61B of each slider region 210, in a manufacturing step of the TAMR head slider 60. FIG. 19 is a perspective view, similar to FIG. 4, showing a step subsequent to that in FIG. 15. FIG. 20 is a perspective view, similar to FIG. 3, showing a step subsequent to that in FIG. 19. FIGS. 21, 22 are perspective views showing a principal part of a lead electrode forming step.

As illustrated in FIG. 10, the wafer like substrate 201 is prepared. The wafer like substrate 201 is formed with a ceramic material such as aluminum oxide-titanium carbide ($Al_2O_3.TiC$) or the like. Scribe lines 220 and 221 are formed on a first surface 201a of the wafer like substrate 201. A plurality of the scribe lines 220 and 221 are formed on the first surface 201a respectively and formed on straight lines at predetermined intervals along certain directions. The scribe lines 220 are orthogonal to the scribe lines 221. A plurality of region surrounded with each scribe lines 220, 221 are slider regions 210 respectively. The slider 61 is formed from each slider region 210.

Next, thin-film forming process is performed concerning the first surface 201a, and thereby the thin-film laminated parts 61D are formed in each slider region 210. When the thin-film forming process is performed, a lead electrode forming step is performed. Thereby, first, second lead electrodes 66, 67 are formed outside the recording head 100B in the thin-film laminated parts 61D.

The lead electrode forming step has an inner electrode forming step and a pad connecting electrode forming step. At first, the inner electrode forming step is performed, and the pad connecting electrode forming step is performed subsequently.

First, second inner electrodes 66a, 67a are formed in the inner electrode forming step. First, second inner electrodes 66a, 67a are formed on the surface of the insulating layer 108 after respective layers from the insulating layer 102 to the insulating layer 108 and the reproducing head 100A are formed (the reproducing head 100A is not illustrated in FIG. 21). First, second inner electrodes 66a, 67a are formed with bar like shapes which extend perpendicular to a planned light source placing surface 261B. First, second inner electrodes 66a, 67a are formed with plating, for example. The planned light source placing surface 261B are parts which become the light source placing surface 261B after the wafer like substrate 201 is cut along scribe lines 220. End surfaces 66c, 67c of first, second lead electrodes 66, 67 are arranged in the planned light source placing surface 261B.

Note that the lead electrode forming step is performed before the wafer like substrate 201 is cut though, FIGS. 21, 22 show structures after the wafer like substrate 201 is cut, for convenience of illustration.

First, second pad connecting electrodes 66b, 67b are formed, in the pad connecting electrode forming step. The pad connecting electrode forming step is performed during the thin-film forming process. The thin-film forming process is performed to form each layer from the insulating layer 109 to an over coat layer 160, thereby the recording head 100B is formed. Then, after the over coat layer 160 is formed, as illustrated in FIG. 22, first, second pad connecting electrodes 66b, 67b are formed. First, second pad connecting electrodes 66b, 67b are formed so as to be connected to first, second inner electrodes 66a, 67a. For example, first, second pad connecting electrodes 66b, 67b are formed as follows.

Two contact holes are formed on the surface of the over coat layer 160, in each slider region 210. The contact holes are formed with etching or the like, for example. Each contact hole reaches first, second inner electrodes 66a, 67a. Surfaces of first, second inner electrodes 66a, 67a are exposed inside each contact hole. When metal layers are formed inside contact holes, first, second pad connecting electrodes 66b, 67b, connected to the first, second inner electrodes 66a, 67a, are formed. Metal layers are formed with plating or the like, for example.

As mentioned above, first, second lead electrodes 66, 67 are formed inside the thin-film laminated part 61D. However, surfaces of first, second pad connecting electrodes 66b, 67b are exposed as pad end surfaces 66d, 67d.

Next, a bar like member forming step is performed. The wafer like substrate 201 is cut along scribe lines 220, in the bar like member forming step. Thereby, a plurality of bar like member 230 are formed, as illustrated in FIG. 11. A plurality of slider region 210 are included in the bar like member 230. Each slider region 210 is divided by scribe lines 221. Further, the bar like member forming step is performed to form the light source placing surface 61B.

Figure 12:
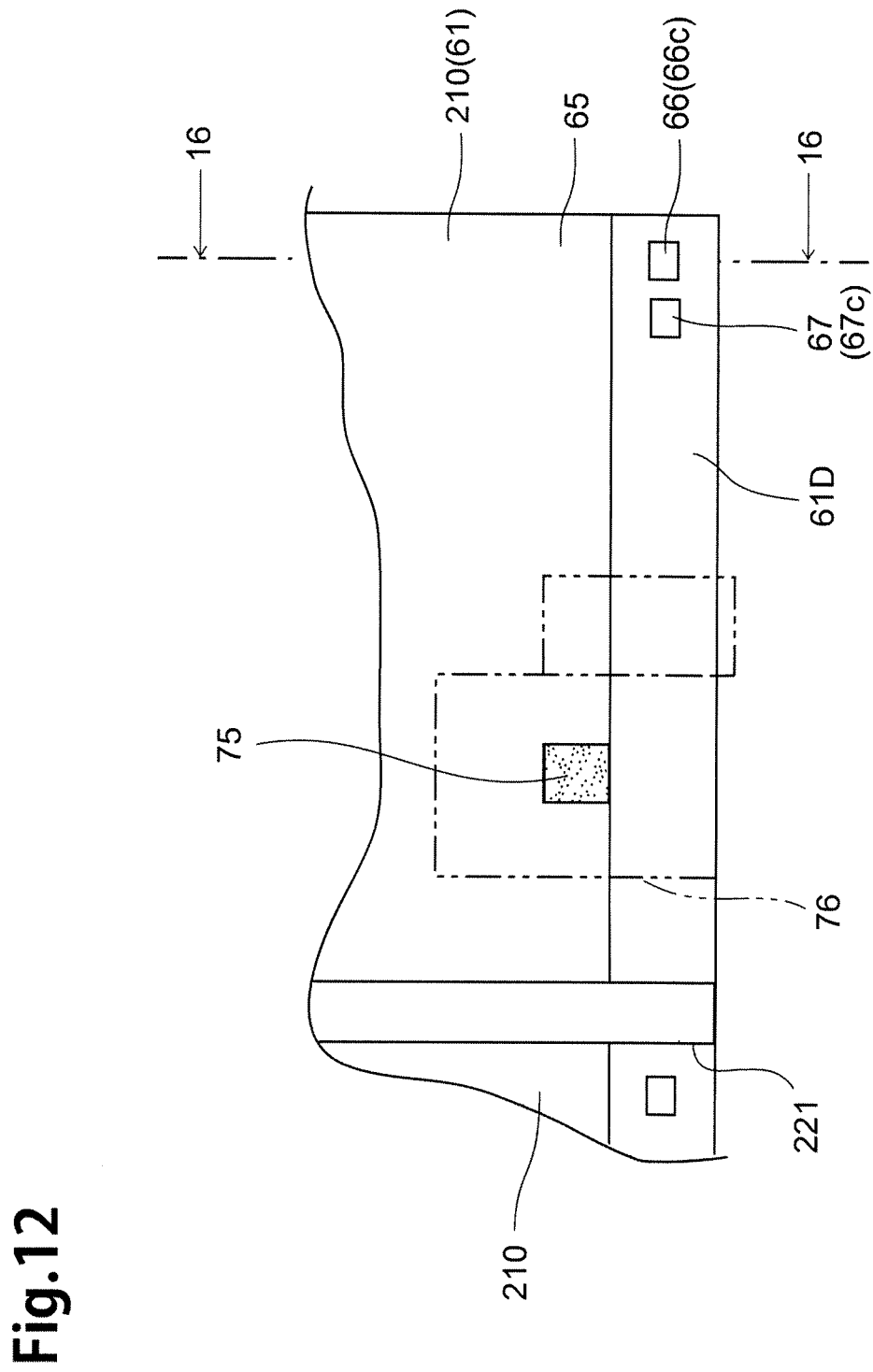
FIG. 12 is a plan view showing a principal part of a light source placing surface in a slider region, in a manufacturing step of the thermally assisted magnetic recording head slider.

Subsequently, a connecting pad forming step is performed. In this step, a connecting pad 75 is formed in the light source unit area 76 of the light source placing surface 61B, as illustrated in FIG. 12. The light source unit area 76 is an area which the LD unit 70 is mounted afterward. The connecting pad 75 is formed to connect the LD unit 70 with the bar like member 230. For example, the connecting pad 75 is formed with alloy including solder, Pb, Bi, by evaporation.

Figure 13:
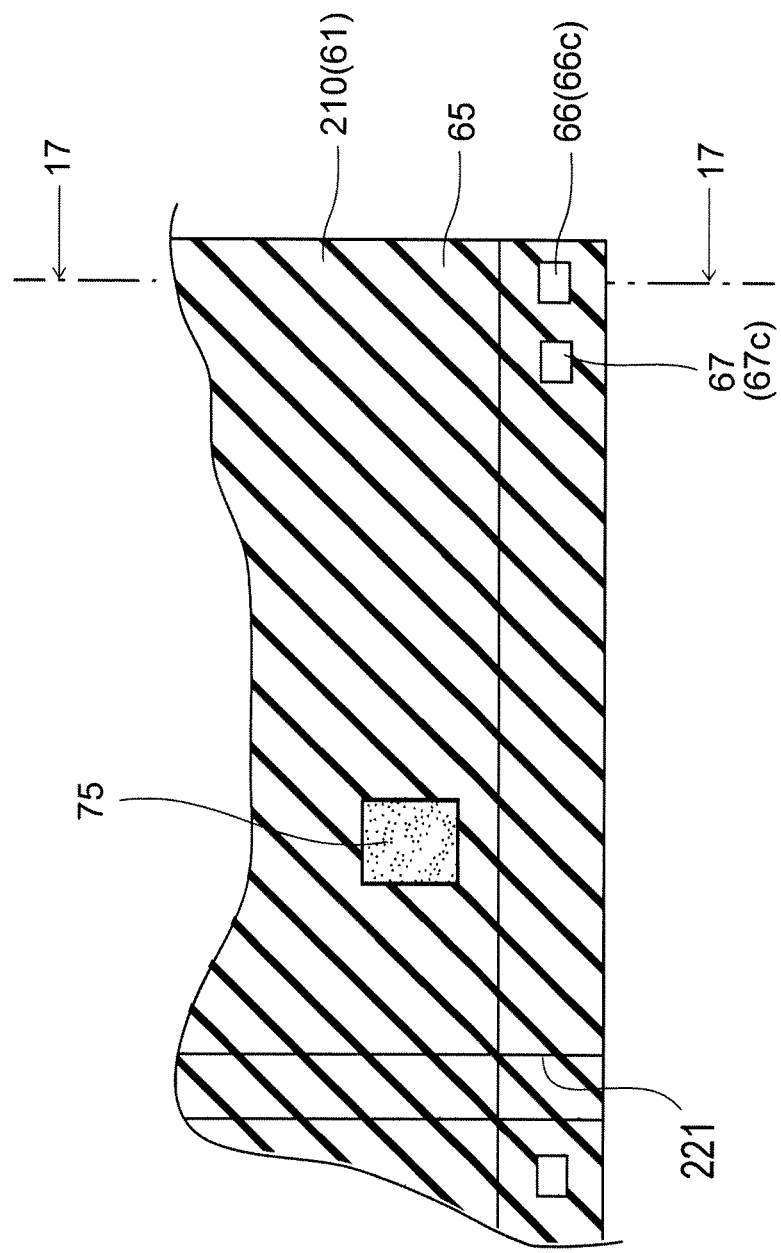
FIG. 13 is a plan view showing a step subsequent to that in FIG. 12.

After that, a cover insulating layer forming step is performed. In this step, as illustrated in FIG. 13, the cover insulating layer 65 is formed on the light source placing surface 61B in each bar like member 230. The cover insulating layer 65 is formed with insulating material such as alumina ($Al_2O_3$) or the like. The part formed on the connecting pad 75 and the parts formed on end surfaces 66c, 67c of the cover insulating layer 65 are removed by etching or the like. Then a part of the cover insulating layer 65 and end surfaces 66c, 67c are exposed.

Subsequently, a light source connecting step and a light source unit mounting step are performed. First, second element electrodes 71a, 72a of the LD unit 70 and first, second lead electrodes 66, 67 are connected each other, in the light source connecting step. The light source connecting step includes a wiring electrode forming step and a conductive pad forming step, in this embodiment.

Figure 14:
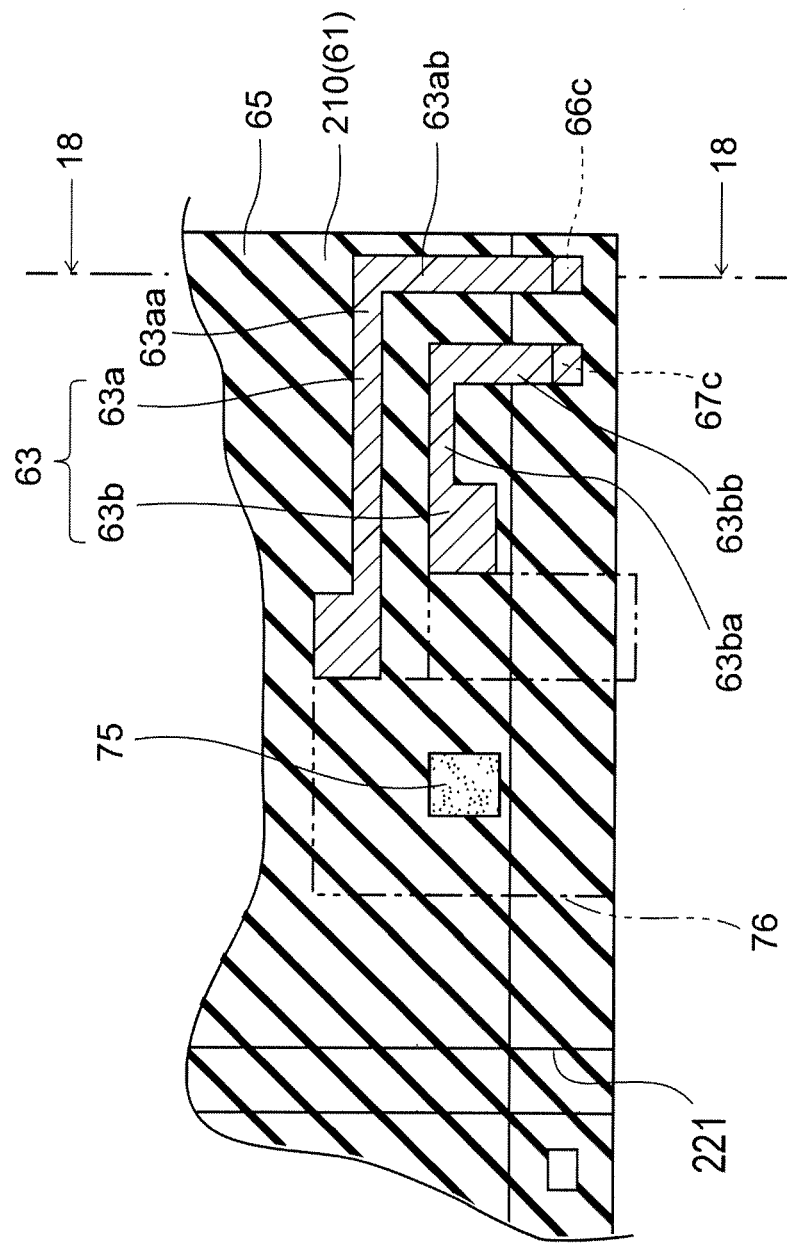
FIG. 14 is a plan view showing a step subsequent to that in FIG. 13.

First, second wiring electrodes 63a, 63b are formed, as illustrated in FIG. 14, in the wiring electrode forming step. The wiring electrode forming step is performed before the LD unit 70 is mounted on the light source unit area 76. First, second wiring electrodes 63a, 63b are formed so as to be connected with end surfaces 66c, 67c of the first, second lead electrodes 66, 67 respectively. First, second wiring electrodes 63a, 63b are formed as following method, for example.

First, a not-shown seed layer for plating is formed on the cover insulating layer 65. Next, a frame (not shown) including groove parts is formed on the seed layer. The frame is formed, for example, by patterning a photoresist by the photolithography. Further, a plating layer which will be parts of the first, second wiring electrodes 63a, 63b is formed within the groove parts of the formed frame and on the seed layer. Next, the frame is removed, and a part of the seed layer other than the part which exists under the plating layer is removed by etching. By the above processing, first, second wiring electrodes 63a, 63b can be formed of the plating layer and the seed layer thereunder.

Further, first, second wiring electrodes 63a, 63b are formed so that widths of first, second wide-width terminal parts 63ac, 63bc are larger than those of the first, second band-shaped terminal parts 63ax, 63bx. Because, first, second conductive pads 64a, 64b, which are formed later, are surely connected to first, second wide-width terminal parts 63ac, 63bc.

Figure 15:
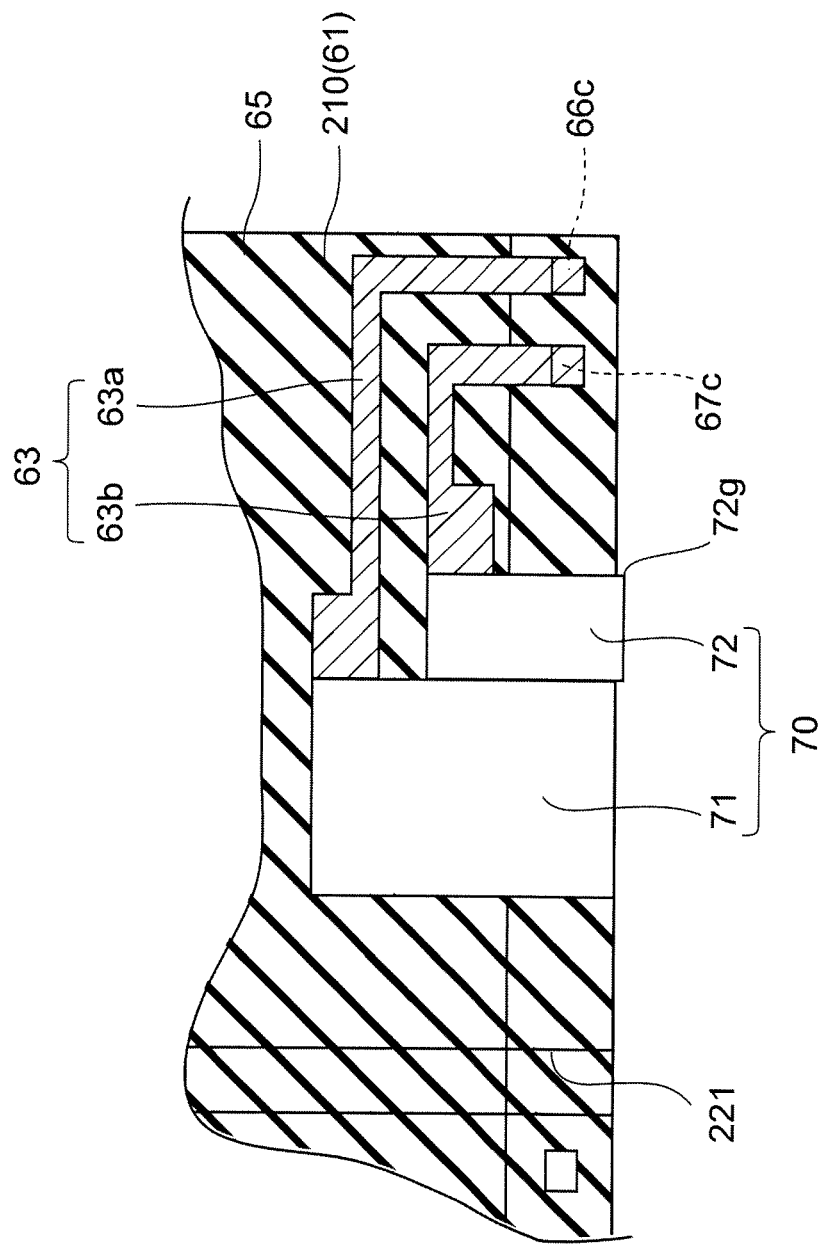
FIG. 15 is a plan view showing a step subsequent to that in FIG. 14.
Figure 16:
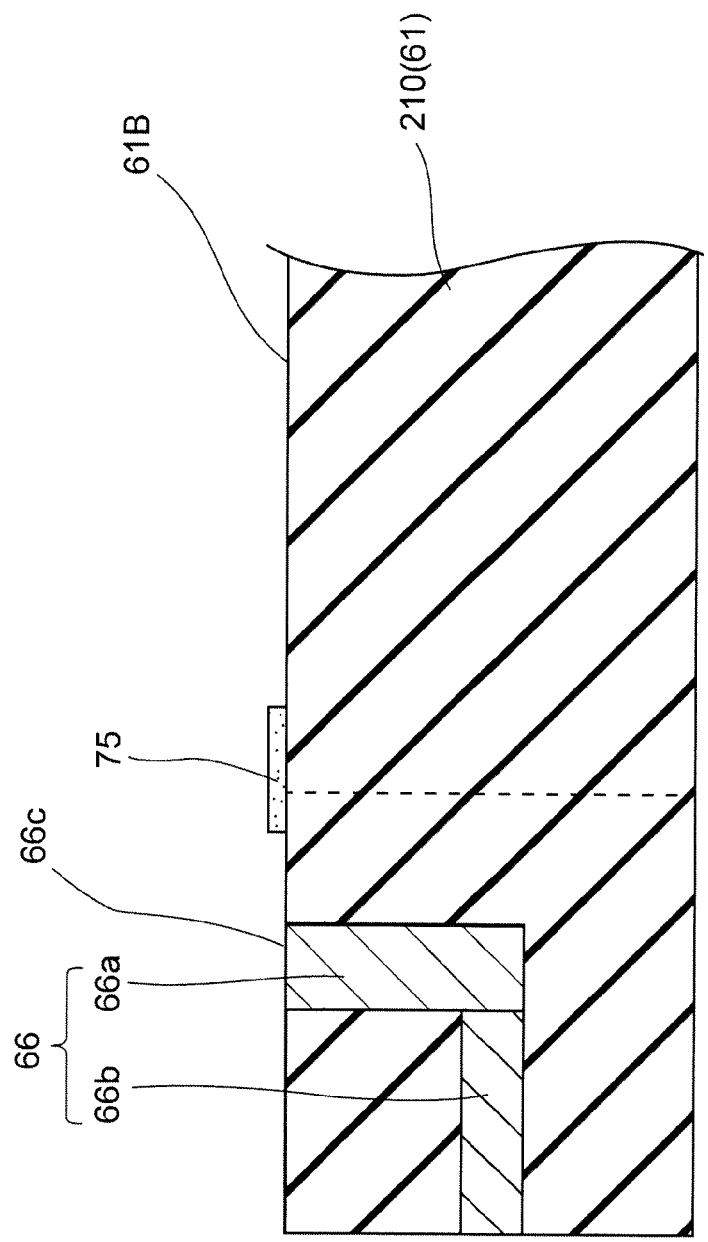
FIG. 16 is a sectional view taken along the line 16-16 in FIG. 12.
Figure 17:
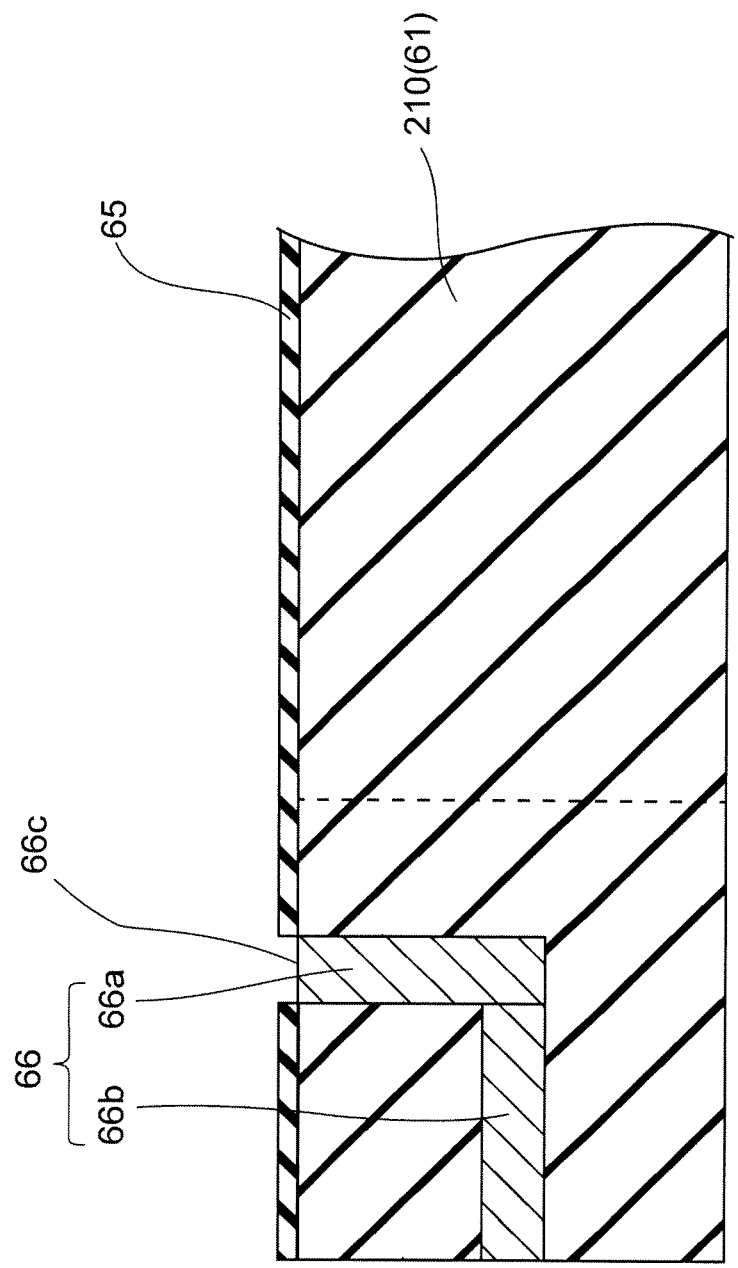
FIG. 17 is a sectional view taken along the line 17-17 in FIG. 13.
Figure 18:
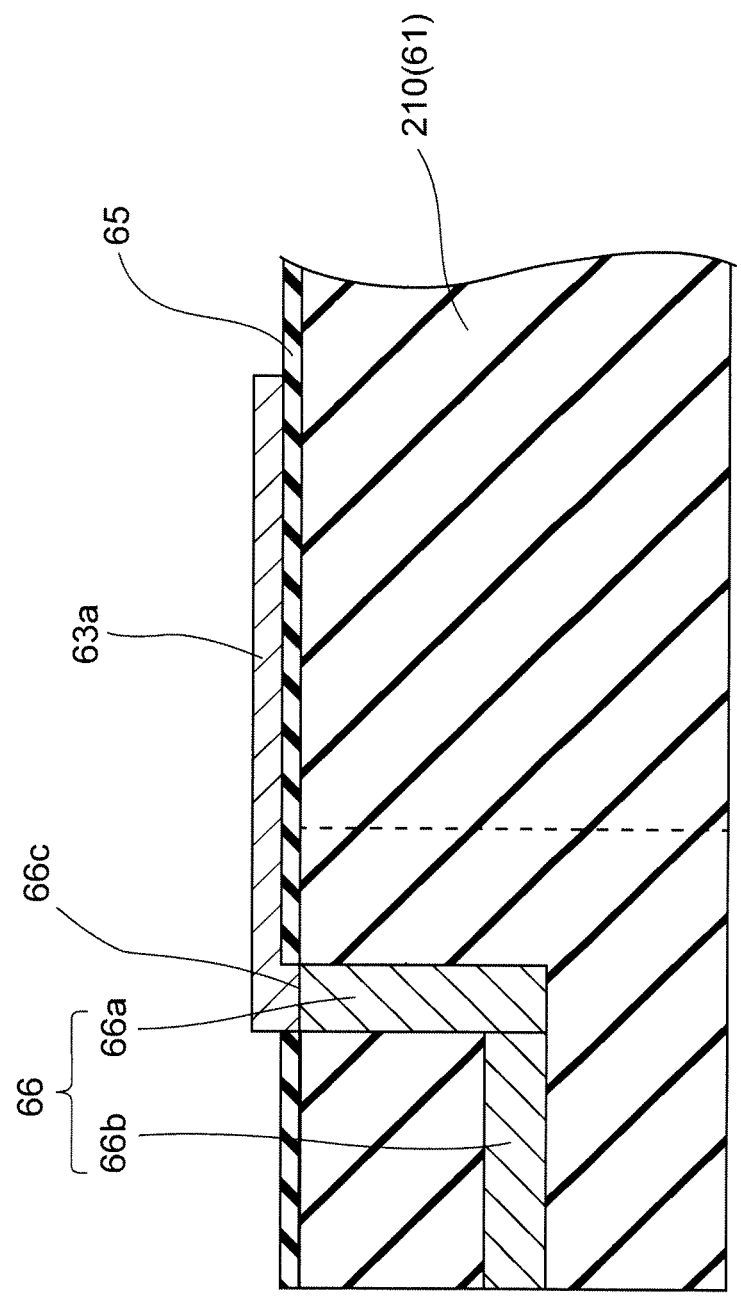
FIG. 18 is a sectional view taken along the line 18-18 in FIG. 14.

Subsequently, the light source unit mounting step is performed. After that, the conductive pad forming step is performed. As illustrated in FIG. 15, LD units 70 are mounted on each slider region 210, in the light source unit mounting step. In this case, the LD unit 70 is mounted on the light source placing surface 61B so that the substrate surface 72f of the LD 72 intersects orthogonally with laminated surfaces (each layer constituting the recording head 100B, such as the insulating layer 108, lower yoke layer 110 or the like) of the thin-film laminated part 61D (see FIG. 19).

First, the LD unit 70 is placed on the light source unit area 76. After that, the submount 71 is heated by irradiation of not illustrated laser beam. Heat is conducted to the connecting pad 75 to melt the connecting pad 75. When irradiation of the laser beam stop, melted the connecting pad 75 becomes hard. Accordingly, the LD unit 70 is fixed on the light source placing surface 61B after irradiation of the laser beam stop. Then, the light source mounting step is completed.

Next, the conductive pad forming step is performed. As illustrated in FIG. 4, first, second conductive pads 64a, 64b are formed with SBB, conductive resin, in this step. Thereby, first, second element electrodes 71a, 72a and first, second wiring electrodes 63a, 63b are connected each other. Subsequently, when bar like members 230 are cut along the scribe lines 221, a plurality of TAMR head slider 60 are manufactured.

After that, the TAMR head slider mounting step is performed. The TAMR head slider 60 is mounted on the suspension 50 as follows, in this step. Thereby HGA 1 is manufactured. In this case, as illustrated in FIG. 20, the TAMR head slider 60 moves along arrow Y direction and is mounted on the tongue part 19 so that the LD unit 70 passes through the passing hole 19c. After that, when each electrode pad 62 and each connecting pad 20 are connected each other, HGA 1 is completed.

Figure 24:
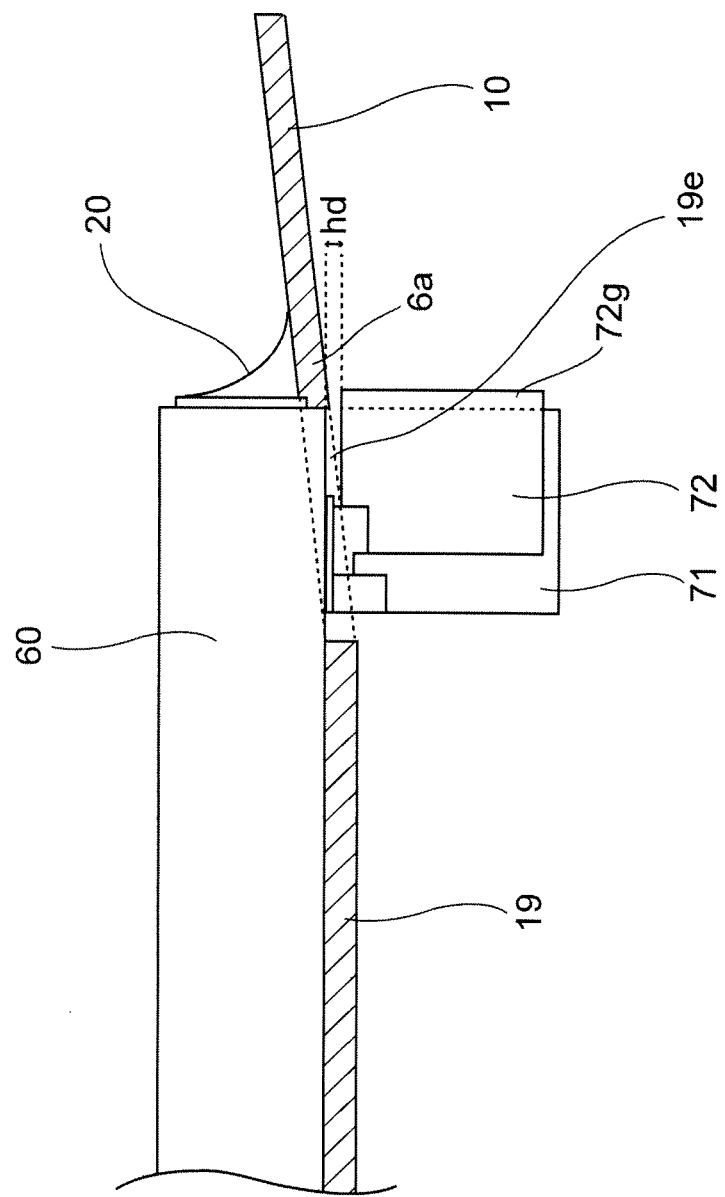
FIG. 24 is a side view showing a principal part of the HGA in FIG. 1.

The projection 72g is formed in the LD 72 of the LD unit 70. However, as illustrated in FIG. 24, because a cutout part 19e corresponding to the projection 72g is formed in the passing hole 19c, contact with the projection 72g and passing hole 19c is avoided. Therefore, the TAMR head sliders 60 are surely mounted on the tongue part 19. Further, because the bending process is performed to out trigger parts 10A, 10A, part of gimbal part 10, which are connected with out trigger parts 10A, 10A and the pad formed part 6a are arranged in the slanting upward direction. Thereby, the height difference hd is secured between the position of the projection 72g and the position of the pad formed part 6a, and both contact is avoided.

(Operation and Effect of TAMR Head Slider)

As mentioned above, the TAMR head slider 60 comprises first optical pattern which means the combination of the LD 72 and PG 116. The LD 72 is mounted on the light source placing surface 61B so that the substrate surface 72f intersects orthogonally with laminated surface (outer end face 61E) of the thin-film laminated part 61D. Therefore, first, second element electrodes 71a, 72a of the LD unit 70 and a plurality of electrode pads 62 are arranged with 90 degree different direction, both are intersecting orthogonally.

On the other hand, for example, in case of the structure which TE mode LD is mounted on the slider, like the conventional slider disclosed in the patent document 5, when the HGA is manufactured, two kinds of wiring having different direction need to be formed. One of two kinds of wirings is a wiring connected with TE mode LD, the other is a wiring connected with electrode pads of slider. Accordingly, manufacturing step for HGA is complicated, and structure of manufactured HGA (structure concerning electrical connection of slider and suspension) is also complicated.

Further, the LD unit is mounted on the flexure so that the LD passes through the HGA. Therefore, the LD is arranged in one side (for example, rear side) of the HGA, the slider is arranged in the other side (for example, front side) of the HGA. Accordingly, when the HGA is manufactured, wirings have to be formed on both side of the HGA. Therefore, manufacturing step for the HGA is much complicated.

However, in case of the TAMR head slider 60 according to the present embodiment, the above-mentioned problems are solved, because first, second connecting wiring part (first, second wiring electrodes 63a, 63b, first, second conductive pads 64a, 64b, and first, second lead electrodes 66, 67) are formed on the light source placing surface 61B.

First, second element electrode 71a, 72a and a plurality of electrode pads 62 are connected, via first, second connecting wiring part. Therefore, electrical connections with suspension are collected in electrode pads 62, in the TAMR head slider 60. Further, the step for connecting electrode pads 62 with connecting pads 20 is sufficient to manufacture the HGA 1, the wiring, which LD is connected with suspension (referred to also "LD wiring"), does not need to be formed. Therefore, the TAMR head slider 60 has a structure which the HGA 1 is able to be formed easily, because the electrical connection with suspension is simplified. Further, manufacturing step for the HGA 1 is simplified, the structure of manufactured HGA 1 is also simplified.

Furthermore, formation of wirings on one side of the HGA 1 (side of arranged TAMR head slider 60) is sufficient to manufacture the HGA 1, wirings do not need to be formed on both sides of the HGA 1. Accordingly, the TAMR head slider 60 has a structure which the HGA 1 is able to be formed more easily. Therefore, the TAMR head slider 60 makes manufacturing step for the HGA 1 simple, the structure of manufactured HGA 1 is also more simplified. On the other hand, in case of the structure which wirings are formed on both sides, like the conventional HGA, a step, for forming a cutout part in slider itself, is necessary for avoiding a contact of the slider and flexure. However, the step, for forming the cutout part in slider 61, is not necessary, because the above-described height difference hd is secured in the HGA 1. Therefore, the manufacturing steps for the TAMR head slider 60 and the HGA 1 are simplified. Reliability of the TAMR head slider 60 and the HGA 1 are improved, because the cutout part is not formed in the slider 61.

Further, because the step for LD wiring becomes needless in manufacturing step for the HGA 1, the number of steps is reduced. Therefore, manufacturing time for the HGA 1 is shortened. The TAMR head slider 60 is comprised of a first optical pattern, cheap TE mode LD is mounted on the TAMR head slider 60. Therefore, manufacturing cost of it is able to be reduces.

On the other hand, the LD and the suspension need to be connected electrically in the manufacturing step for the HGA. In case of the conventional HGA disclosed in the patent document 5, after LD unit is mounted on the slider and the slider is mounted on the suspension, the LD unit needs to be connected with the suspension. Furthermore, the LD wiring needs to be formed in addition to the wiring for slider, the step for the wiring for slider needs to be performed by every HGA.

However, the above problems are also solved about the TAMR head slider 60 according to the present embodiment, because first, second connecting wiring parts are formed on the TAMR head slider 60. Namely, when the LD unit 70 is mounted on each slider region 210 of bar like member 230 illustrated in FIG. 11, and first, second conductive pads 64*a*, 64*b* are formed (the conductive pad forming step), the connection with the LD unit 70 and electrode pads 62 is completed. Therefore, the LD wiring is needless for the LD unit 70, further the connection about the LD unit 70 is completed at the step which the bar like member 230 is manufactured. Connection about the LD unit 70 is completed before manufacturing step proceeds to the TAMR head slider mounting step. Accordingly, the TAMR head slider 60 makes manufacturing step for the HGA 1 more simple.

Further, because first, second lead electrodes 66, 67 are already formed in the thin film forming process, if first, second wiring electrodes 63*a*, 63*b* and first, second conductive pads 64*a*, 64*b* are formed, connection about the LD unit 70 is completed only with that. Therefore, because wirings about the LD unit 70 are manufactured simply, the TAMR head slider 60 has a simple structure.

Further, first, second lead electrodes 66, 67 comprise first, second inner electrodes 66*a*, 67*a* and first, second pad connecting electrodes 66*b*, 67*b*. First, second inner electrodes 66*a*, 67*a* and first, second pad connecting electrodes 66*b*, 67*b* are able to be formed in another steps. Therefore, their position and formation are able to be adjusted corresponding to the number of the electrode 62, position of the light source unit area 76, formation and position of first, second wiring electrodes 63*a*, 63*b*.

First, second wiring electrodes 63*a*, 63*b* have first, second band-shaped terminal parts 63*ax*, 63*bx* and first, second wide-width terminal parts 63*ac*, 63*bc*, and first, second wide-width terminal parts 63*ac*, 63*bc* are formed widthwider than first, second band-shaped terminal parts 63*ax*, 63*bx*. Therefore, first, second wide-width terminal parts 63*ac*, 63*bc* are electrically connected with first, second conductive pads 64*a*, 64*b* surely.

Further, first, second band-shaped terminal parts 63*ax*, 63*bx* have first, second main terminal parts 63*aa*, 63*ba* and first, second sub terminal parts 63*ab*, 63*bb*. Since first, second main terminal parts 63*aa*, 63*ba* are orthogonal to first, second sub terminal parts 63*ab*, 63*bb*, directions of first, second element electrodes 71*a*, 72*a* are different from directions of first, second electrode pads 62A, 62B with 90 degrees though, both are connected surely by first, second band-shaped terminal parts 63*ax*, 63*bx*.

(Embodiments of Hard Disk Drive)

Figure 23:
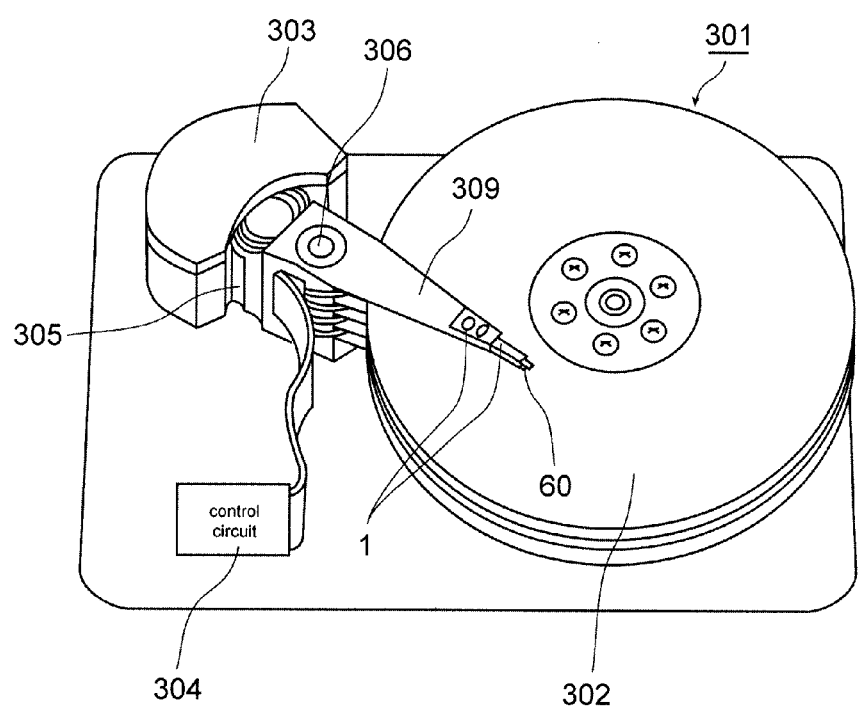
FIG. 23 is a perspective view showing a hard disk drive equipped with the HGA in FIG. 1.

Next, embodiments of the hard disk drive will now be explained with reference to FIG. 23. FIG. 23 is a perspective view illustrating a hard disk drive 301 equipped with the above-mentioned HGA 1. The hard disk drive 301 includes a hard disk (magnetic recording medium) 302 rotating at a high speed and the HGA 1. The hard disk drive 301 is an apparatus which actuates the HGA 1, so as to record/reproduce data onto/from recording surfaces of the hard disk 302. The hard disk 302 has a plurality of (4 in the drawing) platters. Each platter has a recording surface opposing its corresponding to the TAMR head slider 60.

The hard disk drive 301 positions the TAMR head slider 60 on a track by an assembly carriage device 303. The above-described thin-film magnetic head 100 is formed on this TAMR head slider 60. Further, the hard disk drive 301 has a plurality of drive arms 309. The drive arms 309 pivot about a pivot bearing shaft 306 by means of a voice coil motor (VCM) 305, and are stacked in a direction along the pivot bearing shaft 306. Further, the HGA 1 is attached to the tip of each drive arm 309.

Further, the hard disk drive 301 has a control circuit 304 controlling recording/reproducing.

In the hard disk drive 301, when the HGA 310 is rotated, the head slider 60 moves in a radial direction of the hard disk 302, i.e., a direction traversing track lines.

Because the hard disk drive 301 has the HGA 1, the HGA 1 is manufactured easily, the hard disk drive 301 is also able to be manufactured easily.

Modified Example 1

In the above embodiment, the TAMR head slider 60, comprised of the first optical pattern, is explained by way of example. The present invention is applicable to the TAMR head slider (not illustrated) comprised of a second optical pattern, not explained in detail though. In case of the second optical pattern, the LD 72 is the TM mode LD, and the PG 116 is the TE mode PG corresponding to laser light L of TE mode. In this case, TM mode LD is able to be mounted even the same structure with the TAMR head slider 60 comprising the first optical pattern.

Modified Example 2

Further, in the above embodiment, first, second lead electrodes 66, 67 are formed in the insulating layer 8. First, second lead electrodes 66, 67 may be formed in another layer of the thin-film laminated part 61D. Insulating layer such as over coat layer 160 or the like is formed in outer region more than the region which the thin-film magnetic head 100 is formed. First, second lead electrodes 66, 67 may be formed in the insulating layer.

Modified Example 3

Further, in the above embodiment, first, second wiring electrodes 63*a*, 63*b* are formed on the cover insulating layer 65, and whole of them are exposed in the light source placing surface 61B. However, it is sufficient that at least first, second wide-width terminal parts 63ac, 63bc are exposed in the light source placing surface 61B. Thereby, electrical connection of first, second conductive pads 64a, 64b with first, second wide-width terminal parts 63ac, 63bc is secured.

Figure 25:
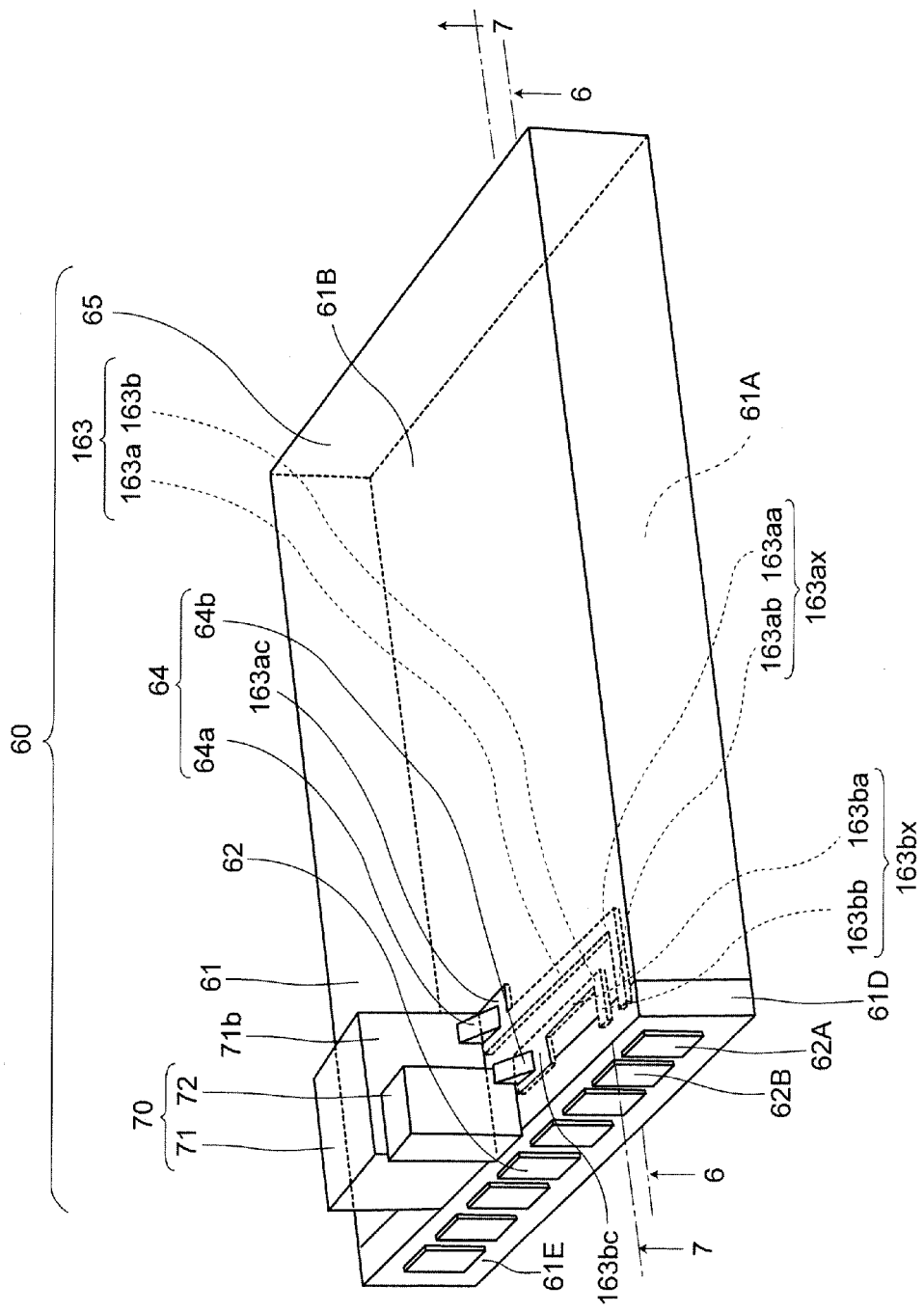
FIG. 25 is a perspective view showing the thermally assisted magnetic recording head slider according to a modified example, similar to FIG. 4.

In this case, as illustrated in FIG. 25, first, second wiring electrodes 163a, 163b may be formed instead of first, second wiring electrodes 63a, 63b. First, second wiring electrodes 163a, 163b is different in that they are formed inside the thin-film laminated part 61D, compared with first, second wiring electrodes 63 a, 63b. Further, first, second wide-width terminal parts 163ac, 163bc are exposed in the light source placing surface 61B, and first, second conductive pads 64a, 64b are connected the exposed parts.

Modified Example 4

Figure 26:
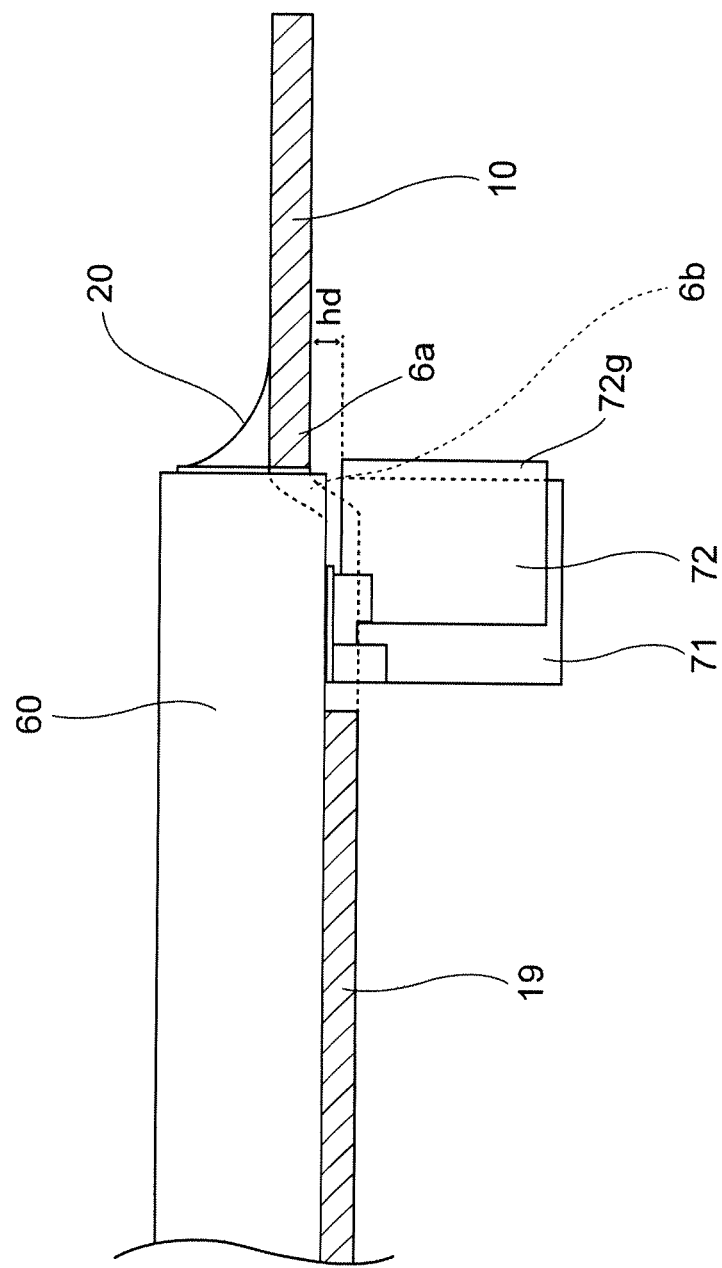
FIG. 26 is a side view showing a principal part of the HGA according to another modified example, similar to FIG. 24.

FIG. 26 is a side view showing a principal part of the HGA according to another modified example, similar to FIG. 24. In the above-described HGA 1, the pad formed part 6a slants so as to approach the TAMR head slider 60. In the HGA 1, the bending process, illustrated in FIG. 26, is able to be performed to the out trigger parts 10A, 10A. A linking part 6b, illustrated in FIG. 26, is formed by the bending process. The linking part 6b causes difference of the up-down direction (height difference hd) between the position of the projection 72g and the position of the pad formed part 6a. Because the height difference hd is secured, contact of the projection 72g and pad formed part 6a is avoided.

What is claimed is:

1. A thermally assisted magnetic recording head slider comprising:
   a light source unit having a light emitting element emitting laser light and a submount holding the light emitting element; and
   a slider including a thin-film laminated part having a main magnetic pole layer, a near-field light generating element and an optical waveguide;
   wherein a combination of the light emitting element and the near-field light generating element is comprised of a first optical pattern which includes a TE mode LD, which emits Laser light with TE mode, and TM mode PG corresponding to laser light with TM mode or a second optical pattern which includes a TM mode LD, which emits laser light with TM mode, and TE mode PG corresponding to laser light with TE mode,
   wherein the light source unit is mounted on a light source placing surface, of the slider, arranged rear side of the medium-opposing surface opposing a magnetic recording medium, so that a substrate surface of the light emitting element are orthogonal to a laminated surface of the thin film laminated part,
   wherein the slider has a plurality of electrode pads formed on an outer end surface of the thin film laminated part side,
   wherein the light source unit includes a first element electrode and a second element electrode for applying voltage to the light emitting element, and
   wherein the slider has a first connecting wiring part and a second connecting wiring part, formed on the light source placing surface, which connect the first element electrode and second element electrode with a first electrode pad and a second electrode pad of the plurality of electrode pads and insulated each other.

2. The thermally assisted magnetic recording head slider according to claim 1,
   wherein the first connecting wiring part and the second connecting wiring part respectively have a first wiring electrode and second wiring electrode formed on the light source placing surface; first conductive pad and second conductive pad connected to the first wiring electrode and second wiring electrode and the first element electrode and second element electrode; and a first lead electrode and second lead electrode connected with the first wiring electrode and second wiring electrode and the first electrode pad and second electrode pad,
   wherein the first lead electrode and second lead electrode are insulated each other and formed in the thin-film laminated part.

3. The thermally assisted magnetic recording head slider according to claim 1,
   wherein the first lead electrode and second lead electrode have a first inner electrode and a second inner electrode connected the first wiring electrode and second wiring electrode, and formed inside the thin-film laminated part, and a first pad connecting electrode and second pad connecting electrode connected with the first electrode pad and second electrode pad.

4. The thermally assisted magnetic recording head slider according to claim 2,
   wherein the first wiring electrode and second wiring electrode have a first band-shaped terminal part and second band-shaped terminal part connected with the first lead electrode and second lead electrode, and a first wide-width terminal part and second wide-width terminal part having width lager than those of the first band-shaped terminal part and second band-shaped terminal part, and connected with the first conductive pad and second conductive pad.

5. The thermally assisted magnetic recording head slider according to claim 4,
   wherein the first band-shaped terminal part and second band-shaped terminal part have main terminal parts which extend along by the outer end surface and sub terminal parts which extend along by direction intersecting orthogonally to main terminal parts.

6. The thermally assisted magnetic recording head slider according to claim 4,
   wherein at least the first wide-width terminal part and second wide-width terminal part are exposed on the light source placing surface in the first wiring electrode and second wiring electrode.

7. A method of manufacturing a thermally assisted magnetic recording head slider comprising a light source unit having a light emitting element emitting laser light and a submount holding the light emitting element; and a slider including a thin-film laminated part having a main magnetic pole layer, a near-field light generating element and an optical waveguide, comprising:
   a lead electrode forming step being formed first lead electrode and second lead electrode in a thin-film forming process which the-thin film laminated part is formed on a substrate having a plurality of slider regions being formed the sliders along scribe lines, the first lead electrode and second lead electrode are extended from a planned light source placing surface, which becomes a light source placing surface arranged rear side of the medium-opposing surface opposing a magnetic recording medium, after the substrate is cut along the scribe lines, to an outer end surface of the thin-film laminated part;

a bar like member forming step being formed a plurality of bar like members having a plurality of the slider regions;

a light source unit mounting step being mounted the light source unit on a light source unit area, which the light source unit is mounted, of the light source placing surface, so that substrate surface of the light emitting element are orthogonal to a laminated surface of the thin-film laminated part; and a light source connecting step being connected a first element electrode and a second element electrode, for applying voltage to the light emitting element of the light source unit, with the first lead electrode and second lead electrode respectively.

8. The method of manufacturing a thermally assisted magnetic recording head slider according to claim 7, wherein light source connecting step has a wiring electrode forming step being formed a first wiring electrode and second wiring electrode connected with the light source unit and the first lead electrode and second lead electrode respectively, before the light source unit is mounted on the light source unit area, and a conductive pad forming step being formed a first conductive pad and second conductive pad connected with the first wiring electrode and second wiring electrode and the first element electrode and a second element electrode respectively, after the light source unit is mounted on the light source unit area.

9. The method of manufacturing a thermally assisted magnetic recording head slider according to claim 8, further comprising:

an electrode pad forming step being formed a plurality of electrode pads, being insulated each other, on the outer end surface of the thin-film laminated part of the slider region;

wherein the lead electrode forming step has an inner electrode forming step being formed a first inner electrode and second inner electrode, which connected with the first wiring electrode and second wiring electrode, and formed inside the thin-film laminated part, and an pad connecting electrode forming step being formed a first pad connecting electrode and second pad connecting electrode connected with the first inner electrode and second inner electrode and a first electrode pad and second electrode pad of the plurality of electrode pads.

10. The method of manufacturing a thermally assisted magnetic recording head slider according to claim 8, wherein the wiring electrode forming step is performed such that a first wide-width terminal part and second wide-width terminal part, which connected with the first conductive pad and second conductive pad are formed with width larger than a first band-shaped terminal part and second band-shaped terminal part, which connected with the first lead electrode and second lead electrode.

11. A head gimbal assembly comprising a thermally assisted magnetic recording head slider, wherein the thermally assisted magnetic recording head slider comprising:

a light source unit having a light emitting element emitting laser light and a submount holding the light emitting element; and a slider including a thin-film laminated part having a main magnetic pole layer, a near-field light generating element and an optical waveguide;

wherein a combination of the light emitting element and the near-field light generating element is comprised of a first optical pattern which includes a TE mode LD, which emits Laser light with TE mode, and TM mode PG corresponding to laser light with TM mode or a second optical pattern which includes a TM mode LD, which emits laser light with TM mode, and TE mode PG corresponding to laser light with TE mode, wherein the light source unit is mounted on a light source placing surface, of the slider, arranged rear side of the medium-opposing surface opposing a magnetic recording medium, so that a substrate surface of the light emitting element are orthogonal to a laminated surface of the thin film laminated part, wherein the slider has a plurality of electrode pads formed on an outer end surface of the thin film laminated part side, wherein the light source unit includes a first element electrode and a second element electrode for applying voltage to the light emitting element, and wherein the slider has a first connecting wiring part and a second connecting wiring part, formed on the light source placing surface, which connect the first element electrode and second element electrode with a first electrode pad and a second electrode pad of the plurality of electrode pads and insulated each other.

12. The head gimbal assembly according to claim 11, wherein the thermally assisted magnetic recording head slider has a projection projected outside from the outer end surface formed in the light emitting element, the thermally assisted magnetic recording head slider further comprising:

a flexure, being mounted the thermally assisted magnetic recording head slider, a passing hole, which the light source unit pass through, are formed, a plurality of connecting pads being connected to the plurality of electrode pads are formed, and a bending process is performed so that a pad formed part, which the plurality of connecting pads are formed, is not in contact with the projection to secure a height difference between a position of the projection and a position of the pad formed part.

13. A hard disk drive comprising a head gimbal assembly having a thermally assisted magnetic recording head slider, and a magnetic recording medium opposing the thermally assisted magnetic recording head slider, wherein the thermally assisted magnetic recording head slider comprising:

a light source unit having a light emitting element emitting laser light and a submount holding the light emitting element; and a slider including a thin-film laminated part having a main magnetic pole layer, a near-field light generating element and an optical waveguide;

wherein a combination of the light emitting element and the near-field light generating element is comprised of a first optical pattern which includes a TE mode LD, which emits Laser light with TE mode, and TM mode PG corresponding to laser light with TM mode or a second optical pattern which includes a TM mode LD, which emits laser light with TM mode, and TE mode PG corresponding to laser light with TE mode, wherein the light source unit is mounted on a light source placing surface, of the slider, arranged rear side of the medium-opposing surface opposing a magnetic recording medium, so that a substrate surface of the light emitting element are orthogonal to a laminated surface of the thin film laminated part, wherein the slider has a plurality of electrode pads formed on an outer end surface of the thin film laminated part side, wherein the light source unit includes a first element electrode and a second element electrode for applying voltage to the light emitting element, and wherein the slider has a first connecting wiring part and a second connecting wiring part, formed on the light source placing surface, which connect the first element electrode and second element electrode with a first electrode pad and a second electrode pad of the plurality of electrode pads and insulated each other.

* * * * *